(12) United States Patent  
Liou et al.

(10) Patent No.: US 9,036,276 B2
(45) Date of Patent: May 19, 2015

(54) OPTICAL IMAGING LENS SET AND ELECTRONIC DEVICE COMPRISING THE SAME

(71) Applicants: Chin-Wei Liou, Taichung (TW); ZhengChao Yuan, Xiamen (CN); LaiShu Cao, Xiamen (CN)

(72) Inventors: Chin-Wei Liou, Taichung (TW); ZhengChao Yuan, Xiamen (CN); LaiShu Cao, Xiamen (CN)

(73) Assignee: Genius Electronic Optical Co., Ltd., Central Taiwan Science Park, Daya District, Taichung (TW)

( * ) Notice: Subject to any disclaimer, the term of this patent is extended or adjusted under 35 U.S.C. 154(b) by 80 days.

(21) Appl. No.: 13/924,614

(22) Filed: Jun. 23, 2013

(65) Prior Publication Data

US 2014/0218812 A1   Aug. 7, 2014

(30) Foreign Application Priority Data

Feb. 6, 2013   (CN) .......................... 2013 1 0047726

(51) Int. Cl.
 *G02B 13/00* (2006.01)
(52) U.S. Cl.
 CPC .................................. *G02B 13/0045* (2013.01)
(58) Field of Classification Search
 CPC .............................. G02B 9/60; G02B 13/0045
 USPC ......... 359/659, 714, 746, 753, 763, 764, 765, 359/769, 770
 See application file for complete search history.

(56) References Cited

U.S. PATENT DOCUMENTS

| 6,999,246 | B2 | 2/2006 | Yamamoto | |
|---|---|---|---|---|
| 7,826,151 | B2 | 11/2010 | Tsai | |
| 7,903,349 | B2 | 3/2011 | Kitahara | |
| 8,000,030 | B2 | 8/2011 | Tang | |
| 8,248,713 | B2 | 8/2012 | Hsieh | |
| 8,289,628 | B2 | 10/2012 | Asami | |
| 2010/0254029 | A1 | 10/2010 | Shinohara | |
| 2010/0328730 | A1 | 12/2010 | Otomo | |
| 2011/0249346 | A1 | 10/2011 | Tang | |
| 2012/0019705 | A1* | 1/2012 | Sano et al. ..................... | 348/340 |
| 2012/0162769 | A1 | 6/2012 | Suzuki | |
| 2012/0188655 | A1* | 7/2012 | Tsai et al. ..................... | 359/714 |
| 2012/0194922 | A1 | 8/2012 | Tang | |
| 2012/0212660 | A1 | 8/2012 | Tang | |
| 2012/0261550 | A1 | 10/2012 | Chou | |
| 2012/0287513 | A1 | 11/2012 | Hsu | |
| 2012/0300315 | A1 | 11/2012 | Chen | |
| 2012/0300316 | A1 | 11/2012 | Tsai | |
| 2013/0021680 | A1 | 1/2013 | Chen | |

FOREIGN PATENT DOCUMENTS

CN        1847908 A      10/2006
CN      101819315 A       9/2010

(Continued)

*Primary Examiner* — Ricky Mack
*Assistant Examiner* — Gary O'Neill
(74) *Attorney, Agent, or Firm* — Winston Hsu; Scott Margo

(57) ABSTRACT

An optical imaging lens set from an object side toward an image side along an optical axis in order includes: a first lens element having an image-side surface with a convex portion in a vicinity of its circular periphery, a second lens element having an object-side surface with a convex portion in a vicinity of its optical axis, a third lens element having an object-side surface with a concave portion in a vicinity of its optical axis, a fourth lens element with positive refractive power, and a plastic fifth lens element having an image-side surface with a concave portion in a vicinity of its optical axis.

18 Claims, 28 Drawing Sheets

(56) References Cited

FOREIGN PATENT DOCUMENTS

| | | |
|---|---|---|
| JP | 2010197665 | 9/2010 |
| JP | 2010282000 | 12/2010 |
| JP | 4858648 B2 | 1/2012 |
| JP | 201237763 | 2/2012 |
| JP | 4947235 B2 | 6/2012 |
| JP | 2012113311 | 6/2012 |
| JP | 2012141423 | 7/2012 |
| JP | 201471299 | 4/2014 |
| TW | 201202780 | 1/2012 |
| TW | 201234068 | 8/2012 |
| TW | 201239444 | 10/2012 |
| TW | 201305591 | 2/2013 |
| WO | 2014034027 A1 | 3/2014 |

* cited by examiner

— 650nm
— 555nm
--- 470nm

Field of view
1.0

Longitudinal spherical aberration

-0.03  0  0.03
Focal length (mm)

Height
3.085

Sagittal astigmatic field aberration

-0.04  0  0.04
Focal length (mm)

Height
3.085

Tangential astigmatic field aberration

-0.04  0  0.04
Focal length (mm)

Height
3.085

Distortion aberration

-2  0  2
Rate (%)

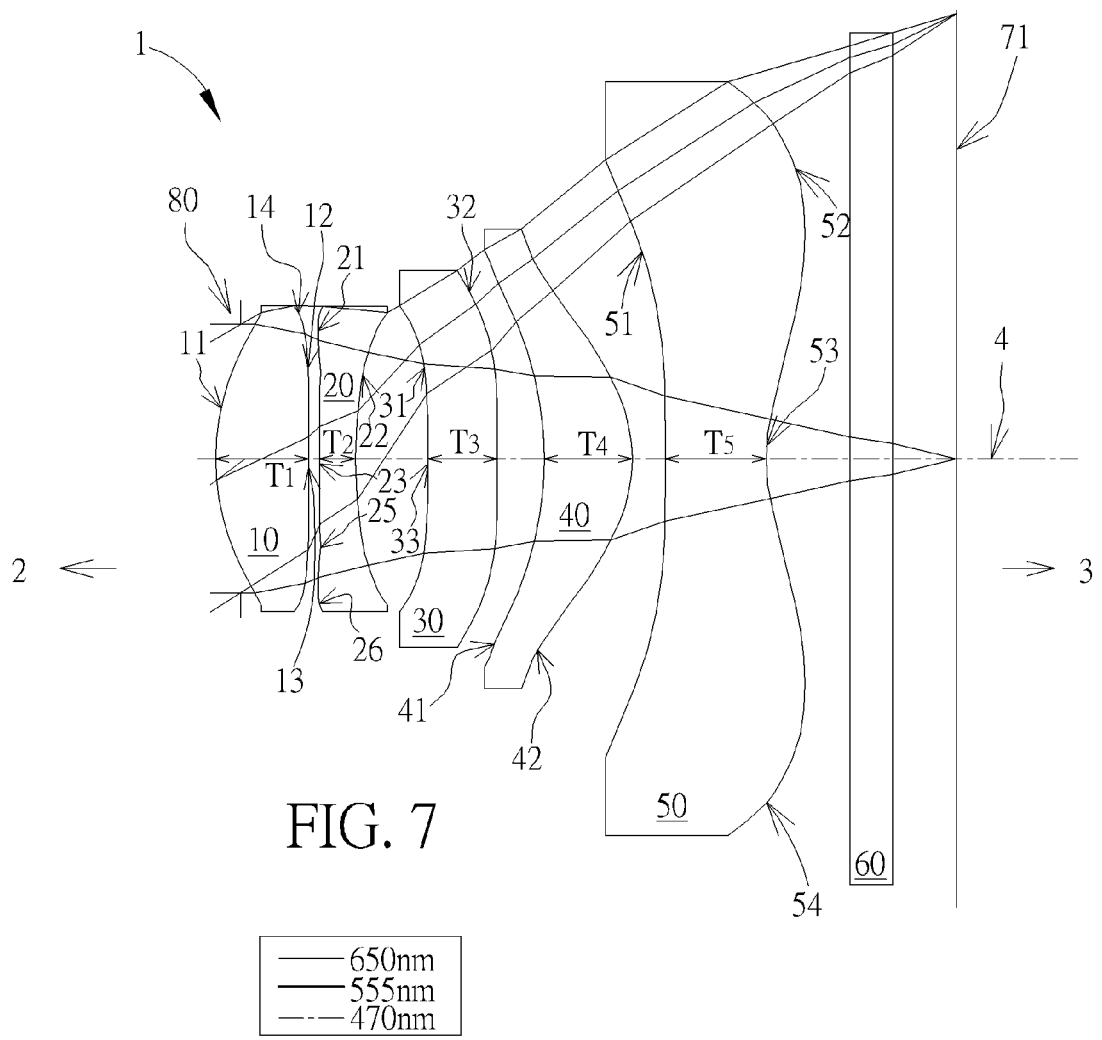
FIG. 7
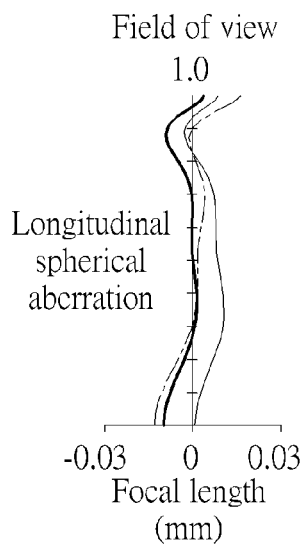 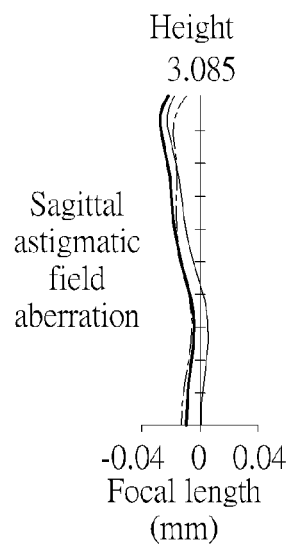 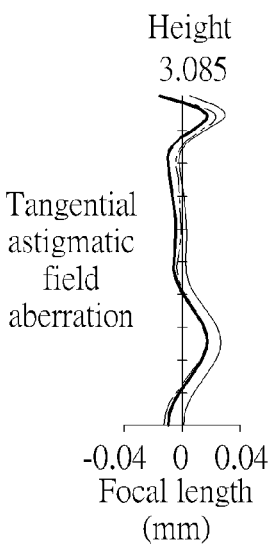 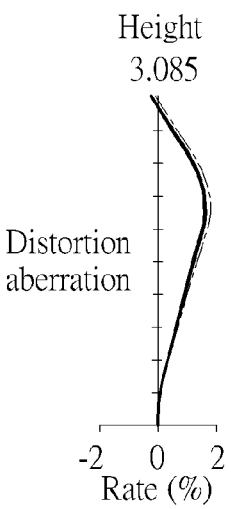
FIG. 8A  FIG. 8B  FIG. 8C  FIG. 8D

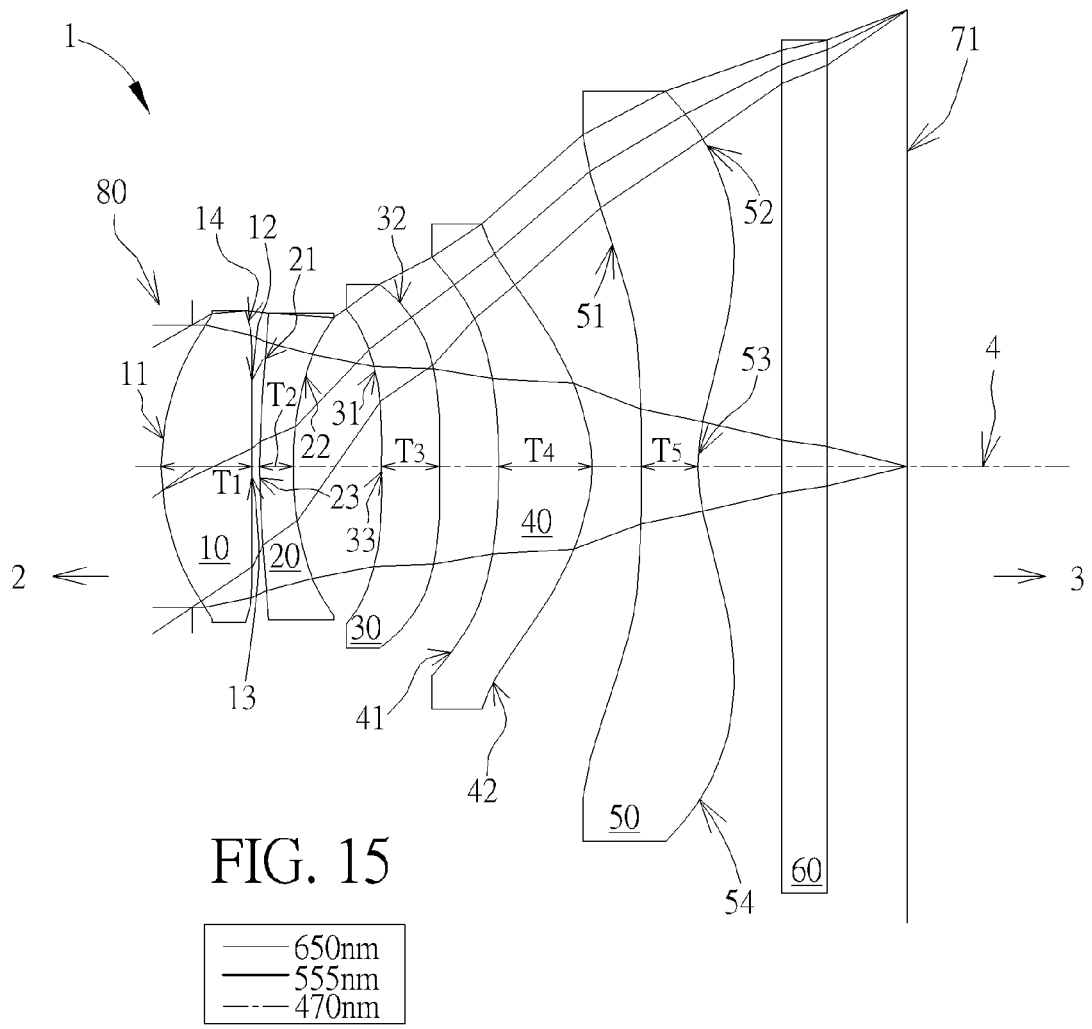
FIG. 15
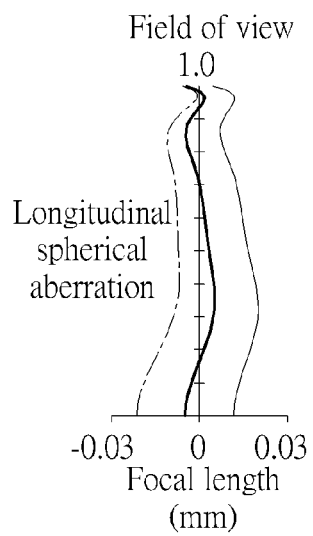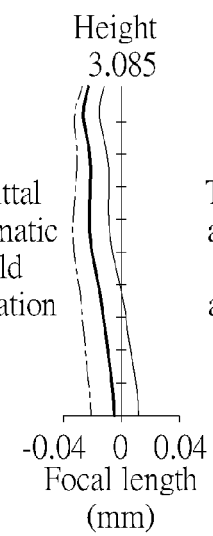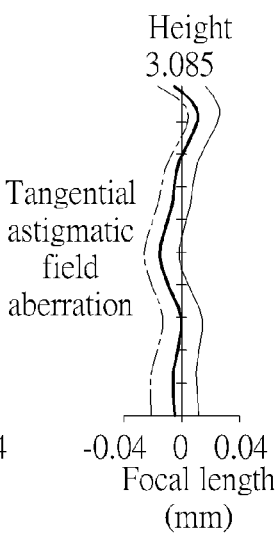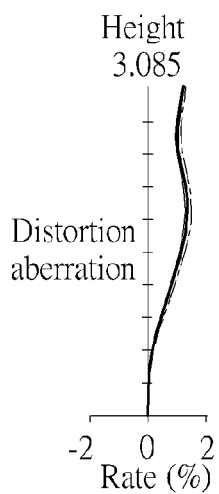
FIG. 16A   FIG. 16B   FIG. 16C   FIG. 16D

| First Example | | | | | | |
|---|---|---|---|---|---|---|
| F= 4.169 mm, HFOV= 36.648 deg. Fno=2.2 | | | | | | |
| No. | | Curvature Radius | Ape. Stop Distance Lens Thickness Air Gap | Refractive Index | Abbe No. | Focal Length | Material |
| | Object | Infinity | Infinity | | | | |
| 80 | Ape. Stop | Infinity | −0.24 | | | | |
| 11 | First Lens | 1.681 | 0.657 $T_1$ | 1.544 | 56.114 | 3.301 | plastic |
| 12 | | 21.516 | 0.057 $G_{12}$ | | | | |
| 21 | Second Lens | 5.046 | 0.240 $T_2$ | 1.640 | 23.529 | −6.554 | plastic |
| 22 | | 2.257 | 0.590 $G_{23}$ | | | | |
| 31 | Third Lens | −10.181 | 0.474 $T_3$ | 1.544 | 56.114 | −34.041 | plastic |
| 32 | | −22.885 | 0.298 $G_{23}$ | | | | |
| 41 | Fourth Lens | −4.031 | 0.533 $T_4$ | 1.544 | 56.114 | 2.516 | plastic |
| 42 | | −1.072 | 0.223 $G_{34}$ | | | | |
| 51 | Fifth Lens | −49.802 | 0.660 $T_5$ | 1.544 | 56.114 | −2.493 | plastic |
| 52 | | 1.406 | 0.572 | | | | |
| 60 | IR Filter | Infinity | 0.300 | | | | |
| | IR Filter-Image Plane | Infinity | 0.540 | | | | |
| 71 | Image Plane | Infinity | | | | | |

FIG. 20

| No. | 11 | 12 | 21 | 22 | 31 |
|---|---|---|---|---|---|
| K | -9.885E-04 | -3.274E+01 | -2.957E-01 | 5.922E-03 | 6.469E+01 |
| a4 | -3.334E-03 | -1.122E-01 | -1.721E-01 | -7.220E-02 | -1.279E-01 |
| a6 | 3.403E-02 | 2.280E-01 | 3.173E-01 | 1.823E-01 | 1.095E-02 |
| a8 | -8.862E-02 | -2.826E-01 | -3.003E-01 | -1.383E-01 | - |
| a10 | 1.032E-01 | 1.499E-01 | 9.539E-02 | 5.895E-02 | - |
| a12 | -5.408E-02 | -4.549E-02 | - | - | - |
| a14 | - | - | - | - | - |
| a16 | - | - | - | - | - |
| No. | 32 | 41 | 42 | 51 | 52 |
| K | -1.244E+02 | -1.579E-01 | -2.889E+00 | 1.151E+02 | -7.355E+00 |
| a4 | -1.306E-01 | -2.663E-02 | -3.841E-02 | -5.541E-02 | -6.002E-02 |
| a6 | -7.096E-03 | -1.453E-02 | 4.575E-03 | 9.183E-03 | 2.053E-02 |
| a8 | - | -1.652E-02 | 1.802E-03 | 7.014E-04 | -6.466E-03 |
| a10 | - | 1.824E-02 | 2.894E-03 | -2.503E-04 | 1.298E-03 |
| a12 | - | -4.721E-03 | -9.355E-04 | 1.424E-05 | -1.574E-04 |
| a14 | - | - | - | - | 9.926E-06 |
| a16 | - | - | - | - | -2.231E-07 |

FIG. 21

| | | Second Example | | | | | |
|---|---|---|---|---|---|---|---|
| | | F= 3.78 mm, HFOV=34.33 deg. Fno=2.2 | | | | | |
| No. | | Curvature Radius | Ape. Stop Distance Lens Thickness Air Gap | Refractive Index | Abbe No. | Focal Length | Material |
| | Object | Infinity | Infinity | | | | |
| 80 | Ape. Stop | Infinity | -0.24 | | | | |
| 11 | First Lens | 1.685 | 0.654 $T_1$ | 1.544 | 56.114 | 3.302 | plastic |
| 12 | | 22.202 | 0.057 $G_{12}$ | | | | |
| 21 | Second Lens | 5.249 | 0.251 $T_2$ | 1.640 | 23.529 | -6.571 | plastic |
| 22 | | 2.300 | 0.549 $G_{23}$ | | | | |
| 31 | Third Lens | -10.181 | 0.422 $T_3$ | 1.544 | 56.114 | -67.115 | plastic |
| 32 | | -14.304 | 0.349 $G_{34}$ | | | | |
| 41 | Fourth Lens | -3.981 | 0.558 $T_4$ | 1.544 | 56.114 | 2.639 | plastic |
| 42 | | -1.110 | 0.270 $G_{45}$ | | | | |
| 51 | Fifth Lens | -50.014 | 0.586 $T_5$ | 1.544 | 56.114 | -2.534 | plastic |
| 52 | | 1.429 | 0.572 | | | | |
| 60 | IR Filter | Infinity | 0.3 | | | | |
| | IR Filter-Image Plane | Infinity | 0.532 | | | | |
| 71 | Image Plane | Infinity | | | | | |

FIG. 22

| No. | 11 | 12 | 21 | 22 | 31 |
|---|---|---|---|---|---|
| K | -0.0021182 | -32.05823 | 0.2190528 | -0.0243758 | 52.58697 |
| a4 | -0.0033246 | -0.1120957 | -0.1715997 | -0.0731094 | -0.1349919 |
| a6 | 0.03394968 | 0.22823018 | 0.31721022 | 0.18315513 | 0.00949955 |
| a8 | -0.0885989 | -0.2824968 | -0.3003361 | -0.1379626 | - |
| a10 | 0.10323857 | 0.14992391 | 0.09559916 | 0.05873329 | - |
| a12 | -0.0540495 | -0.0454572 | - | - | - |
| a14 | - | - | - | - | - |
| a16 | - | - | - | - | - |
| No. | 32 | 41 | 42 | 51 | 52 |
| K | 37.18502 | -0.5784175 | -3.17084 | 211.6197 | -7.288066 |
| a4 | -0.1335341 | -0.0261071 | -0.0368596 | -0.0545191 | -0.0603839 |
| a6 | -0.0074564 | -0.0152773 | 0.00496111 | 0.00916745 | 0.02050049 |
| a8 | - | -0.0166977 | 0.00198916 | 0.00070007 | -0.0064578 |
| a10 | - | 0.01843488 | 0.00296782 | -0.0002495 | 0.0012995 |
| a12 | - | -0.0045656 | -0.0009057 | 1.45E-05 | -0.0001573 |
| a14 | - | - | - | - | 9.92E-06 |
| a16 | - | - | - | - | -2.26E-07 |

FIG. 23

| Third Example | | | | | | |
|---|---|---|---|---|---|---|
| F= 4.074 mm, HFOV= 36.925 deg. Fno=2.2 | | | | | | |
| No. | | Curvature Radius | Ape. Stop Distance Lens Thickness Air Gap | Refractive Index | Abbe No. | Focal Length | Material |
| | Object | Infinity | Infinity | | | | |
| 80 | Ape. Stop | Infinity | -0.2 | | | | |
| 11 | First Lens | 1.682 | 0.637 $T_1$ | 1.544 | 56.114 | 3.114 | plastic |
| 12 | | 133.873 | 0.080 $G_{12}$ | | | | |
| 21 | Second Lens | 36.752 | 0.243 $T_2$ | 1.650 | 21.667 | -5.976 | plastic |
| 22 | | 3.532 | 0.548 $G_{23}$ | | | | |
| 31 | Third Lens | -56.391 | 0.423 $T_3$ | 1.535 | 55.635 | -241.878 | plastic |
| 32 | | -100.017 | 0.336 $G_{34}$ | | | | |
| 41 | Fourth Lens | -2.670 | 0.631 $T_4$ | 1.535 | 55.635 | 2.656 | plastic |
| 42 | | -1.006 | 0.242 $G_{45}$ | | | | |
| 51 | Fifth Lens | -100.178 | 0.69 $T_5$ | 1.535 | 55.635 | -2.553 | plastic |
| 52 | | 1.391 | 0.572 | | | | |
| 60 | IR Filter | Infinity | 0.3 | | | | |
| | IR Filter-Image Plane | Infinity | 0.439 | | | | |
| 71 | Image Plane | Infinity | | | | | |

FIG. 24

| No. | 11 | 12 | 21 | 22 | 31 |
|---|---|---|---|---|---|
| K | -5.086787 | 0 | 0 | -33.0412 | 0 |
| a4 | 0.13148688 | -0.0709496 | -0.1081648 | 0.0495385 | -0.1593029 |
| a6 | -0.0506823 | 0.10790667 | 0.3063476 | 0.09843663 | 0.02532104 |
| a8 | -0.0022581 | -0.1227171 | -0.5107014 | -0.1111717 | -0.1240098 |
| a10 | 0.01655428 | 0.01885709 | 0.71432793 | 0.0877567 | 0.11813632 |
| a12 | 0.00730939 | - | -0.801656 | 0.01861335 | -0.0434402 |
| a14 | -0.0269627 | - | 0.51539236 | -0.0866313 | - |
| a16 | - | - | -0.1245685 | 0.05427392 | - |
| a18 | - | - | - | - | - |
| No. | 32 | 41 | 42 | 51 | 52 |
| K | 0 | 1.282003 | -0.7427539 | 0 | -6.602018 |
| a4 | -0.1254581 | -0.047578 | 0.12252445 | -0.0913769 | -0.0713218 |
| a6 | 0.00752323 | -0.005402 | -0.1065869 | 0.06859882 | 0.04128792 |
| a8 | -0.0245012 | 0.02795262 | 0.08684012 | -0.0391413 | -0.0196585 |
| a10 | 0.01178414 | -0.0067167 | -0.0262184 | 0.01341051 | 0.00610562 |
| a12 | - | - | 0.00310064 | -0.00257 | -0.0012295 |
| a14 | - | - | - | 0.00025498 | 0.00015382 |

FIG. 25

| Fourth Example | | | | | | | |
|---|---|---|---|---|---|---|---|
| F= 4.078 mm, HFOV= 37.062 deg. Fno=2.2 | | | | | | | |
| No. | | Curvature Radius | Ape. Stop Distance Lens Thickness Air Gap | Refractive Index | Abbe No. | Focal Length | Material |
|  | Object | Infinity | Infinity |  |  |  |  |
| 80 | Ape. Stop | Infinity | -0.2 |  |  |  |  |
| 11 | First Lens | 1.671 | 0.642 $T_1$ | 1.544 | 56.114 | 3.094 | plastic |
| 12 |  | 137.399 | 0.080 $G_{12}$ |  |  |  |  |
| 21 | Second Lens | 36.752 | 0.243 $T_2$ | 1.650 | 21.667 | -5.951 | plastic |
| 22 |  | 3.518 | 0.502 $G_{23}$ |  |  |  |  |
| 31 | Third Lens | -66.928 | 0.478 $T_3$ | 1.535 | 55.635 | 375.878 | plastic |
| 32 |  | -50.371 | 0.324 $G_{34}$ |  |  |  |  |
| 41 | Fourth Lens | -2.6811 | 0.610 $T_4$ | 1.535 | 55.635 | 2.742 | plastic |
| 42 |  | -1.0251 | 0.233 $G_{45}$ |  |  |  |  |
| 51 | Fifth Lens | -100.077 | 0.694 $T_5$ | 1.535 | 55.635 | -2.556 | plastic |
| 52 |  | 1.393 | 0.572 |  |  |  |  |
| 60 | IR Filter | Infinity | 0.3 |  |  |  |  |
|  | IR Filter-Image Plane | Infinity | 0.443 |  |  |  |  |
| 71 | Image Plane | Infinity |  |  |  |  |  |

FIG. 26

| No. | 11 | 12 | 21 | 22 | 31 |
|---|---|---|---|---|---|
| K | -4.933996 | 0 | 0 | -33.56895 | 0 |
| a4 | 0.13014396 | -0.071134 | -0.105701 | 0.05390324 | -0.1432472 |
| a6 | -0.0514414 | 0.10471268 | 0.30713468 | 0.09868587 | 0.03931684 |
| a8 | -0.0020231 | -0.1211416 | -0.5129379 | -0.1115204 | -0.1177038 |
| a10 | 0.01675303 | 0.0179901 | 0.71308676 | 0.08748673 | 0.11807216 |
| a12 | 0.00713456 | - | -0.8013014 | 0.01779756 | -0.043416 |
| a14 | -0.027715 | - | 0.51621166 | -0.0873425 | - |
| a16 | - | - | -0.1246959 | 0.05460511 | - |
| a18 | - | - | - | - | - |
| No. | 32 | 41 | 42 | 51 | 52 |
| K | 0 | 1.032715 | -0.7277719 | 0 | -6.689467 |
| a4 | -0.1046486 | -0.0331649 | 0.13287667 | -0.0932575 | -0.0720494 |
| a6 | 0.01016706 | -0.003038 | -0.1024755 | 0.06901297 | 0.04169829 |
| a8 | -0.0221902 | 0.02717856 | 0.08754503 | -0.0391133 | -0.0197152 |
| a10 | 0.01259378 | -0.0069857 | -0.0264518 | 0.01341081 | 0.00610139 |
| a12 | - | - | 0.00287382 | -0.0025705 | -0.0012294 |
| a14 | - | - | - | 0.00025486 | 0.0001539 |

FIG. 27

| | | Fifth Example | | | | | |
|---|---|---|---|---|---|---|---|
| | | \multicolumn{6}{c}{F= 4.169 mm, HFOV=36.144 deg. Fno=2.2} | | | | | |
| No. | | Curvature Radius | Apc. Stop Distance Lens Thickness Air Gap | Refractive Index | Abbe No. | Focal Length | Material |
| | Object | Infinity | Infinity | | | | |
| 80 | Ape. Stop | Infinity | -0.24 | | | | |
| 11 | First Lens | 1.685 | 0.660 $T_1$ | 1.544 | 1.544 | 3.298 | plastic |
| 12 | | 22.638 | 0.057 $G_{12}$ | | | | |
| 21 | Second Lens | 5.207 | 0.248 $T_2$ | 1.640 | 1.640 | -6.606 | plastic |
| 22 | | 2.299 | 0.561 $G_{23}$ | | | | |
| 31 | Third Lens | -10.181 | 0.419 $T_3$ | 1.544 | 1.544 | -69.099 | plastic |
| 32 | | -14.147 | 0.349 $G_{34}$ | | | | |
| 41 | Fourth Lens | -3.933 | 0.558 $T_4$ | 1.544 | 1.544 | 2.628 | plastic |
| 42 | | -1.104 | 0.250 $G_{45}$ | | | | |
| 51 | Fifth Lens | -50.009 | 0.589 $T_5$ | 1.544 | 1.544 | -2.542 | plastic |
| 52 | | 1.433 | 0.572 | | | | |
| 60 | IR Filter | Infinity | 0.3 | | | | |
| | IR Filter-Image Plane | Infinity | 0.535 | | | | |
| 71 | Image Plane | Infinity | | | | | |

FIG. 28

| No. | 11 | 12 | 21 | 22 | 31 |
|---|---|---|---|---|---|
| K | -0.0030434 | -36.761 | 0.2577517 | -0.0185427 | 50.3897 |
| a4 | -0.0035543 | -0.1121533 | -0.1715694 | -0.0730274 | -0.1348338 |
| a6 | 0.03390744 | 0.22810086 | 0.31727253 | 0.18319945 | 0.00951114 |
| a8 | -0.0885751 | -0.282564 | -0.3003293 | -0.1379075 | - |
| a10 | 0.10326361 | 0.14995097 | 0.09553684 | 0.05883157 | - |
| a12 | -0.054052 | -0.0453503 | - | - | - |
| a14 | - | - | - | - | - |
| a16 | - | - | - | - | - |
| No. | 32 | 41 | 42 | 51 | 52 |
| K | 45.61722 | -0.024292 | -3.153329 | 178.8218 | -7.311664 |
| a4 | -0.1340695 | -0.0273395 | -0.0368808 | -0.0542647 | -0.0601829 |
| a6 | -0.0076573 | -0.0154422 | 0.00494625 | 9.18E-03 | 0.0204603 |
| a8 | - | -0.0167402 | 0.00198901 | 0.00069897 | -0.0064607 |
| a10 | - | 0.01842107 | 0.00297009 | -0.00025 | 1.30E-03 |
| a12 | - | -0.0045668 | -0.0009039 | 1.44E-05 | -1.57E-04 |
| a14 | - | - | - | - | 9.92E-06 |
| a16 | - | - | - | - | -2.26E-07 |

FIG. 29

| | | | Sixth Example | | | | |
|---|---|---|---|---|---|---|---|
| | | | F= 4.169 mm, HFOV=36.685 deg. Fno=2.2 | | | | |
| No. | | Curvature Radius | Ape. Stop Distance Lens Thickness Air Gap | Refractive Index | Abbe No. | Focal Length | Material |
| | Object | Infinity | Infinity | | | | |
| 80 | Ape. Stop | Infinity | -0.24 | | | | |
| 11 | First Lens | 1.716 | 0.656 $T_1$ | 1.544 | 56.114 | 3.33 | plastic |
| 12 | | 26.332 | 0.057 $G_{12}$ | | | | |
| 21 | Second Lens | 6.108 | 0.250 $T_2$ | 1.640 | 23.529 | -6.936 | plastic |
| 22 | | 2.540 | 0.466 $G_{23}$ | | | | |
| 31 | Third Lens | -10.181 | 0.600 $T_3$ | 1.544 | 56.114 | -30.328 | plastic |
| 32 | | -26.985 | 0.239 $G_{34}$ | | | | |
| 41 | Fourth Lens | -3.514 | 0.443 $T_4$ | 1.544 | 56.114 | 2.991 | plastic |
| 42 | | -1.165 | 0.434 $G_{45}$ | | | | |
| 51 | Fifth Lens | -22.400 | 0.617 $T_5$ | 1.544 | 56.114 | -2.936 | plastic |
| 52 | | 1.743 | 0.572 | | | | |
| 60 | IR Filter | Infinity | 0.3 | | | | |
| | IR Filter-Image Plane | Infinity | 0.493 | | | | |
| 71 | Image Plane | Infinity | | | | | |

FIG. 30

| No. | 11 | 12 | 21 | 22 | 31 |
|---|---|---|---|---|---|
| K | -0.0110296 | 63.33139 | -0.4116651 | -0.4431026 | 22.90298 |
| a4 | -0.00198 | -0.1114371 | -0.1723171 | -0.0793215 | -0.121214 |
| a6 | 0.0341796 | 0.22762692 | 0.31454451 | 0.18413464 | 0.03648382 |
| a8 | -0.088238 | -0.2832639 | -0.3016698 | -0.1395025 | - |
| a10 | 0.10366818 | 0.1494583 | 0.0953074 | 0.05575168 | - |
| a12 | -0.0537327 | -0.0452894 | - | - | - |
| a14 | - | - | - | - | - |
| a16 | - | - | - | - | - |
| No. | 32 | 41 | 42 | 51 | 52 |
| K | 418.2293 | 5.919339 | -2.908035 | -2267.366 | -6.83637 |
| a4 | -0.1151041 | -0.0165742 | -0.0393621 | -0.0558247 | -0.0623326 |
| a6 | -0.0130331 | -0.0245453 | 0.00458549 | 9.07E-03 | 0.02074654 |
| a8 | - | -0.0191437 | 0.00216574 | 0.000705 | -0.0064423 |
| a10 | - | 0.01825413 | 0.00309842 | -0.0002464 | 1.30E-03 |
| a12 | - | -0.0044799 | -0.000833 | 1.53E-05 | -1.57E-04 |
| a14 | - | - | - | - | 9.92E-06 |

FIG. 31

| Seventh Example ||||||||
|---|---|---|---|---|---|---|---|
| F= 4.169 mm, HFOV=36.226 deg. Fno=2.2 ||||||||
| No. | | Curvature Radius | Ape. Stop Distance Lens Thickness Air Gap | Refractive Index | Abbe No. | Focal Length | Material |
| | Object | Infinity | Infinity | | | | |
| 80 | Ape. Stop | Infinity | 0.600 $T_1$ | | | | |
| 11 | First Lens | 1.664 | 0.057 $G_{12}$ | 1.544 | 56.114 | 3.347 | plastic |
| 12 | | 16.268 | 0.222 $T_2$ | | | | |
| 21 | Second Lens | 4.537 | 0.574 $G_{23}$ | 1.640 | 23.529 | -6.831 | plastic |
| 22 | | 2.192 | 0.354 $T_3$ | | | | |
| 31 | Third Lens | -10.181 | 0.486 $G_{34}$ | 1.544 | 56.114 | -76.746 | plastic |
| 32 | | -13.614 | 0.601 $T_4$ | | | | |
| 41 | Fourth Lens | -4.953 | 0.349 $G_{45}$ | 1.544 | 56.114 | 2.424 | plastic |
| 42 | | -1.089 | 0.369 $T_5$ | | | | |
| 51 | Fifth Lens | -40.839 | 0.572 | 1.544 | 56.114 | -2.266 | plastic |
| 52 | | 1.280 | 0.3 | | | | |
| 60 | IR Filter | Infinity | 0.531 | | | | |
| | IR Filter-Image Plane | Infinity | | | | | |
| 71 | Image Plane | Infinity | | | | | |

FIG. 32

| No. | 11 | 12 | 21 | 22 | 31 |
|---|---|---|---|---|---|
| K | 0.01139942 | 129.722 | 2.709325 | 0.01614624 | 54.20287 |
| a4 | -0.0043769 | -0.1055853 | -0.1688711 | -0.0750648 | -0.1497494 |
| a6 | 0.03650859 | 0.22829542 | 0.32159448 | 0.18306867 | -0.0033052 |
| a8 | -0.0881132 | -0.2807884 | -0.3002347 | -0.1349828 | - |
| a10 | 0.10309259 | 0.15071815 | 0.09649143 | 0.06036758 | - |
| a12 | -0.0540835 | -0.0469446 | - | - | - |
| a14 | - | - | - | - | - |
| a16 | - | - | - | - | - |
| No. | 32 | 41 | 42 | 51 | 52 |
| K | 120.5635 | 3.347549 | -3.47247 | 94.32578 | -6.88393 |
| a4 | -0.1491503 | -0.0370362 | -0.0409441 | -0.0542797 | -0.0641634 |
| a6 | -0.0009981 | -0.0116098 | 0.00128117 | 9.09E-03 | 0.02051335 |
| a8 | - | -0.0160388 | 0.00169296 | 0.00069705 | -0.0064099 |
| a10 | - | 0.01823121 | 0.00313461 | -0.0002484 | 1.30E-03 |
| a12 | - | -0.0046836 | -0.0007988 | 1.49E-05 | -1.57E-04 |
| a14 | - | - | - | - | 9.89E-06 |
| a16 | - | - | - | - | -2.35E-07 |

FIG. 33

| No. | | Curvature Radius | Ape. Stop Distance Lens Thickness Air Gap | Refractive Index | Abbe No. | Focal Length | Material |
|---|---|---|---|---|---|---|---|
| | Eighth Example |||||||
| | F= 4.169 mm, HFOV= 36.134 deg, Fno= 2.2 |||||||
| | Object | Infinity | Infinity | | | | |
| 80 | Ape. Stop | Infinity | -0.24 | | | | |
| 11 | First Lens | 1.657 | 0.608 $T_1$ | 1.544 | 56.114 | 3.322 | plastic |
| 12 | | 16.679 | 0.057 $G_{12}$ | | | | |
| 21 | Second Lens | 4.570 | 0.224 $T_2$ | 1.640 | 23.529 | -6.775 | plastic |
| 22 | | 2.190 | 0.601 $G_{23}$ | | | | |
| 31 | Third Lens | -10.181 | 0.391 $T_3$ | 1.544 | 56.114 | -63.825 | plastic |
| 32 | | -14.578 | 0.395 $G_{34}$ | | | | |
| 41 | Fourth Lens | -4.915 | 0.632 $T_4$ | 1.544 | 56.114 | 2.412 | plastic |
| 42 | | -1.086 | 0.329 $G_{45}$ | | | | |
| 51 | Fifth Lens | -47.381 | 0.383 $T_5$ | 1.544 | 56.114 | -2.29 | plastic |
| 52 | | 1.288 | 0.572 | | | | |
| 60 | IR Filter | Infinity | 0.3 | | | | |
| | IR Filter-Image Plane | Infinity | 0.544 | | | | |
| 71 | Image Plane | Infinity | | | | | |

FIG. 34

| No. | 11 | 12 | 21 | 22 | 31 |
|---|---|---|---|---|---|
| K | 0.01669121 | 117.9261 | 1.885167 | 0.00245779 | 44.4524 |
| a4 | -0.0036604 | -0.1069725 | -0.1701744 | -0.0733924 | -0.1393744 |
| a6 | 0.03627327 | 0.22818235 | 0.32057076 | 0.18292421 | -0.0011839 |
| a8 | -0.0882531 | -0.2807953 | -0.3007839 | -0.1356096 | - |
| a10 | 0.10311806 | 0.15075917 | 0.09600769 | 0.06009457 | - |
| a12 | -0.0539032 | -0.0468692 | - | - | - |
| a14 | - | - | - | - | - |
| a16 | - | - | - | - | - |
| No. | 32 | 41 | 42 | 51 | 52 |
| K | 108.4437 | 4.529128 | -3.393973 | 123.0157 | -7.006942 |

FIG. 35

|  | First Example | Second Example | Third Example | Fourth Example | Fifth Example | Sixth Example | Seventh Example | Eighth Example |
|---|---|---|---|---|---|---|---|---|
| $T_{al}$ | 2.564 | 2.472 | 2.631 | 2.667 | 2.476 | 2.565 | 2.147 | 2.239 |
| $G_{aa}$ | 1.169 | 1.225 | 1.207 | 1.140 | 1.218 | 1.197 | 1.467 | 1.383 |
| $T_{al}/G_{12}$ | 44.685 | 43.074 | 32.738 | 33.185 | 43.145 | 44.705 | 37.420 | 39.018 |
| $G_{34}/G_{45}$ | 1.340 | 1.292 | 1.386 | 1.385 | 1.395 | 0.552 | 1.392 | 1.200 |
| $T_4/G_{34}$ | 1.786 | 1.600 | 1.880 | 1.883 | 1.600 | 1.850 | 1.237 | 1.600 |
| $G_{aa}/G_{34}$ | 3.918 | 3.513 | 3.596 | 3.519 | 3.490 | 5.000 | 3.019 | 3.500 |
| $T_1/T_2$ | 2.738 | 2.604 | 2.619 | 2.641 | 2.650 | 2.623 | 2.700 | 2.720 |
| $G_{23}/G_{34}$ | 1.979 | 1.574 | 1.635 | 1.549 | 1.609 | 1.948 | 1.183 | 1.521 |
| $T_4/T_5$ | 0.807 | 0.953 | 0.906 | 0.879 | 0.947 | 0.718 | 1.628 | 1.650 |

FIG. 36

OPTICAL IMAGING LENS SET AND ELECTRONIC DEVICE COMPRISING THE SAME

CROSS REFERENCE TO RELATED APPLICATION

This application claims priority to China Application No. 201310047726.6, filed on Feb. 6, 2013.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of five lens elements and an electronic device which includes such optical imaging lens set of five lens elements.

2. Description of the Prior Art

In recent years, the popularity of mobile phones and digital cameras makes the photography modules of various portable electronic products, such as optical imaging lens elements or an image sensor . . . develop quickly, and the shrinkage of mobile phones and digital cameras also makes a greater and greater demand for the miniaturization of the photography module. The current trend of research is to develop an optical imaging lens set of a shorter length with uncompromised good quality.

With the development and shrinkage of a charge coupled device (CCD) or a complementary metal oxide semiconductor element (CMOS), the optical imaging lens set installed in the photography module shrinks to meet the demands as well. However, good and necessary optical properties, such as the system aberration improvement, as well as production cost and production feasibility should be taken into consideration, too.

For example, U.S. Pat. No. 8,289,628, U.S. Pat. No. 8,248,713 and US 2012/0194922 all disclose an optical imaging lens set made of five lens elements. In these structures, the image-side surface of the first lens element and the object-side surface of the second lens element are concave as a whole so that there is a fairly large gap between the two lens elements, and the total length of the optical imaging lens set is even up to 10 mm-18 mm. The imaging result is not ideal.

Further, U.S. Pat. No. 6,999,246, U.S. Pat. No. 7,903,349 and US 2010/0328730 all disclose another optical imaging lens set made of five lens elements. In these structures, the fifth lens element is convex as a whole so not both the total length and the imaging quality are always good enough.

These disclosed dimensions do not show good examples of the shrinkage of portable electronic products, such as mobile phones and digital cameras. It is still a problem, on one hand, to reduce the system length efficiently and, on the other hand, to maintain a sufficient optical performance in this field.

SUMMARY OF THE INVENTION

In the light of the above, the present invention is capable of proposing an optical imaging lens set of lightweight, low production cost, reduced length, high resolution and high image quality. The optical imaging lens set of five lens elements of the present invention has an aperture stop, a first lens element, a second lens element, a third lens element, a fourth lens element and a fifth lens element sequentially from an object side to an image side along an optical axis.

The first lens element of the optical imaging lens set of five lens elements of the present invention has a first image-side surface facing toward the image side. The first image-side surface has a convex part in a vicinity of a circular periphery of the first lens element. The second lens element of the optical imaging lens set of five lens elements of the present invention has a second object-side surface facing toward the object side. The second object-side surface has a convex part in a vicinity of the optical axis. The third lens element of the optical imaging lens set of five lens elements of the present invention has a third object-side surface facing toward the object side. The third object-side surface has a concave part in a vicinity of the optical axis. The fourth lens element of the optical imaging lens set of five lens elements of the present invention has positive refractive power. The fifth lens element of the optical imaging lens set of five lens elements of the present invention is made of plastic and has a fifth image-side surface facing toward the image side. The fifth image-side surface has a concave part in a vicinity of the optical axis.

In the optical imaging lens set of five lens elements of the present invention, an air gap has a thickness $G_{12}$ and is disposed between the first lens element and the second lens element along the optical axis; an air gap has a thickness $G_{23}$ and is disposed between the second lens element and the third lens element along the optical axis; an air gap has a thickness $G_{34}$ and is disposed between the third lens element and the fourth lens element along the optical axis, and an air gap has a thickness $G_{45}$ and is disposed between the fourth lens element and the fifth lens element along the optical axis; so total four air gaps between the first lens element and the fifth lens element along the optical axis have a total thickness $G_{aa}$.

In the optical imaging lens set of five lens elements of the present invention, the first lens element has a thickness $T_1$ along the optical axis, the second lens element has a thickness $T_2$ along the optical axis, the third lens element has a thickness $T_3$ along the optical axis, the fourth lens element has a thickness $T_4$ along the optical axis, the fifth lens element has a thickness $T_5$ along the optical axis, so in total the first lens element, the second lens element, the third lens element, the fourth lens element and the fifth lens element together have a total thickness $T_{al}$ along the optical axis.

In the optical imaging lens set of five lens elements of the present invention, the optical imaging lens set satisfies $(T_{al}/G_{12}) \leq 45$.

In the optical imaging lens set of five lens elements of the present invention, the fifth lens element further has a fifth object-side surface facing toward the object side. The fifth object-side surface has a concave part in a vicinity of the optical axis.

In the optical imaging lens set of five lens elements of the present invention, it is $(T_4/G_{34}) \leq 1.9$.

In the optical imaging lens set of five lens elements of the present invention, the fifth object-side surface of the fifth lens element further has a concave part in a vicinity of a circular periphery of the fifth lens element.

In the optical imaging lens set of five lens elements of the present invention, it is $(T_1/T_2) \geq 2.35$.

In the optical imaging lens set of five lens elements of the present invention, it is $(G_{34}/G_{45}) \leq 1.4$.

In the optical imaging lens set of five lens elements of the present invention, it is $(T_4/T_5) \leq 1.9$ or $(T_4/T_5) \leq 1.8$.

In the optical imaging lens set of five lens elements of the present invention, the third lens element has negative refractive power.

In the optical imaging lens set of five lens elements of the present invention, it is $(G_{aa}/G_{34}) \leq 5.3$.

In the optical imaging lens set of five lens elements of the present invention, it is $1.0 \leq (G_{23}/G_{34}) \leq 2.0$.

The optical imaging lens set of five lens elements of the present invention has advantages: 1) the fourth lens element of the optical imaging lens set of five lens elements of the present invention has positive refractive power to yield the positive refractive power of the entire optical imaging lens set of five lens elements of the present invention; 2) the convex part in a vicinity of a circular periphery of the first image-side surface of the first lens element, the convex part in a vicinity of the optical axis of the second object-side surface of the second lens element, the concave part in a vicinity of the optical axis of the third object-side surface of the third lens element and the concave part in a vicinity of the optical axis of the fifth lens element together provide better imaging results.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit and an image sensor disposed at the substrate and at an image side of the optical imaging lens set.

In the electronic device of the present invention, the module housing unit further includes a seat element for the installation of the barrel to move along the optical axis.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 illustrates a fourth example of the optical imaging lens set of five lens elements of the present invention.

FIG. 8A illustrates the longitudinal spherical aberration on the image plane of the fourth example.

FIG. 8B illustrates the astigmatic aberration on the sagittal direction of the fourth example.

FIG. 8C illustrates the astigmatic aberration on the tangential direction of the fourth example.

FIG. 8D illustrates the distortion aberration of the fourth example.

FIG. 15 illustrates an eighth example of the optical imaging lens set of five lens elements of the present invention.

FIG. 16A illustrates the longitudinal spherical aberration on the image plane of the eighth example.

FIG. 16B illustrates the astigmatic aberration on the sagittal direction of the eighth example.

FIG. 16C illustrates the astigmatic aberration on the tangential direction of the eighth example.

FIG. 16D illustrates the distortion aberration of the eighth example.

FIG. 20 shows the optical data of the first example of the optical imaging lens set.

FIG. 21 shows the aspheric surface data of the first example.

FIG. 22 shows the optical data of the second example of the optical imaging lens set.

FIG. 23 shows the aspheric surface data of the second example.

FIG. 24 shows the optical data of the third example of the optical imaging lens set.

FIG. 25 shows the aspheric surface data of the third example.

FIG. 26 shows the optical data of the fourth example of the optical imaging lens set.

FIG. 27 shows the aspheric surface data of the fourth example.

FIG. 28 shows the optical data of the fifth example of the optical imaging lens set.

FIG. 29 shows the aspheric surface data of the fifth example.

FIG. 30 shows the optical data of the sixth example of the optical imaging lens set.

FIG. 31 shows the aspheric surface data of the sixth example.

FIG. 32 shows the optical data of the seventh example of the optical imaging lens set.

FIG. 33 shows the aspheric surface data of the seventh example.

FIG. 34 shows the optical data of the eighth example of the optical imaging lens set.

FIG. 35 shows the aspheric surface data of the eighth example.

FIG. 36 shows some important ratios in the examples.

DETAILED DESCRIPTION

Figure 17:
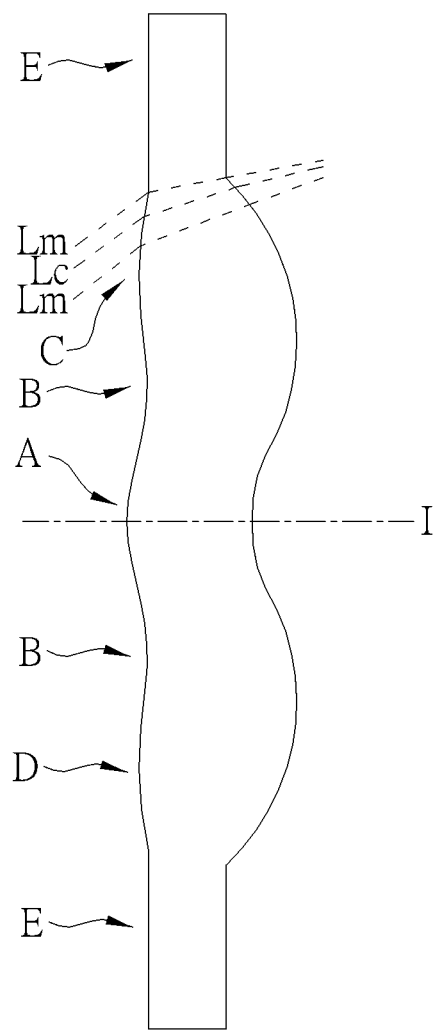
FIG. 17 illustrates exemplificative shapes of the optical imaging lens element of the present invention.

Before the detailed description of the present invention, the first thing to be noticed is that in the present invention, similar (not necessarily identical) elements share the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taken FIG. 17 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 17. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11, 13 and 15.

Figure 1:
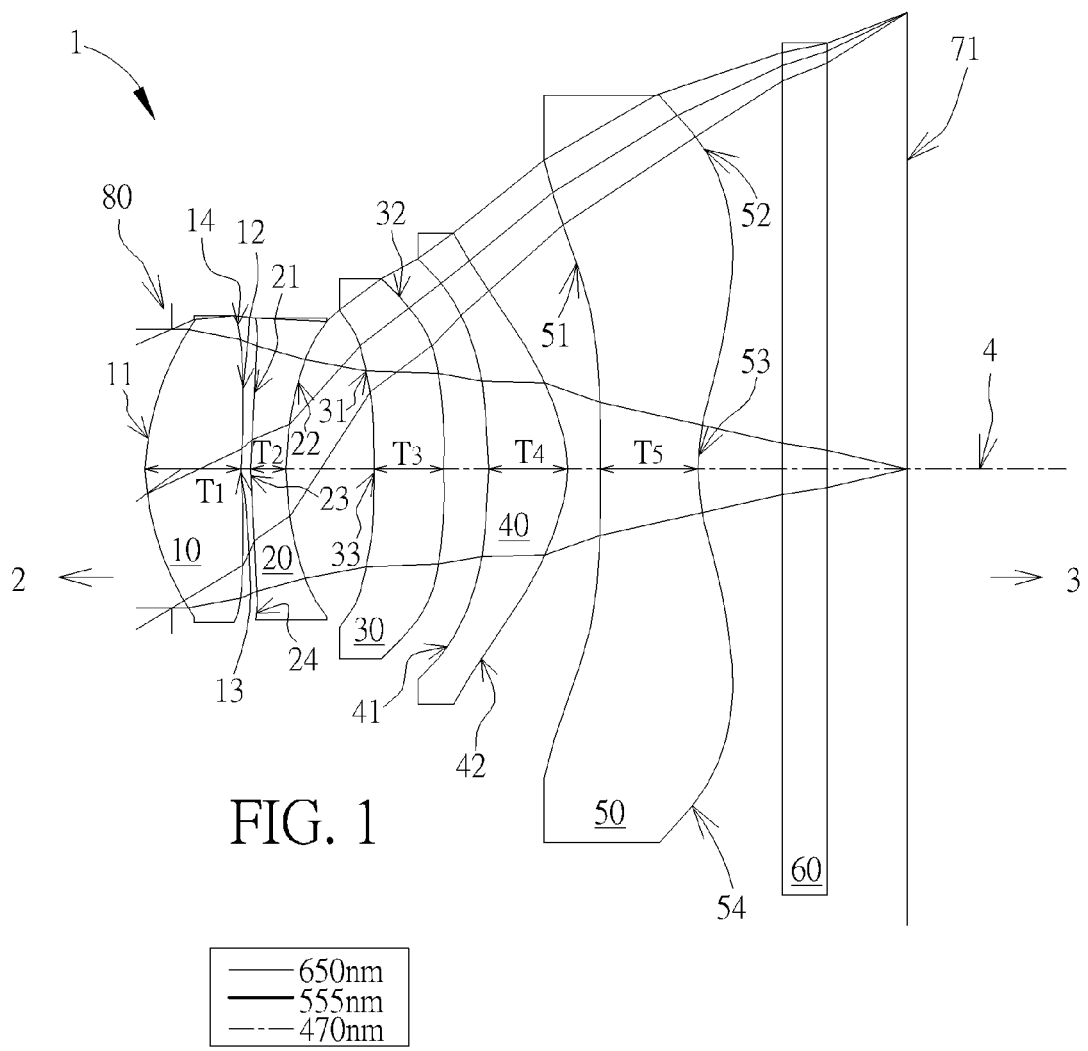
FIG. 1 illustrates a first example of the optical imaging lens set of five lens elements of the present invention.

As shown in FIG. 1, the optical imaging lens set 1 of five lens elements of the present invention, sequentially from an object side 2 (where an object is located) to an image side 3 along an optical axis 4, has a first lens element 10, a second lens element 20, a third lens element 30, a fourth lens element 40, a fifth lens element 50, a filter 60 and an image plane 71. Generally speaking, the first lens element 10, the second lens element 20, the third lens element 30, the fourth lens element 40 and the fifth lens element 50 may be made of a transparent plastic material and each has an appropriate refractive power, but the present invention is not limited to this. There are exclusively five lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed in front of the first lens element 10, but the present invention is not limited to this. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50 and the filter 60.

In the embodiments of the present invention, the optional filter 60 may be a filter of various suitable functions, for example, the filter 60 may be an infrared cut filter (IR cut filter), placed between the fifth lens element 50 and the image plane 71. The filter 60 is made of glass, without affecting the focal length of the optical lens element system, namely the optical imaging lens set, of the present invention.

Each lens element in the optical imaging lens set 1 of the present invention has an object-side surface facing toward the object side 2 as well as an image-side surface facing toward the image side 3. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52. In addition, each object-side surface or image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4.

Each lens element in the optical imaging lens set 1 of the present invention further has a central thickness T on the optical axis 4. For example, the first lens element 10 has a first lens element thickness $T_1$, the second lens element 20 has a second lens element thickness $T_2$, the third lens element 30 has a third lens element thickness $T_3$, the fourth lens element 40 has a fourth lens element thickness $T_4$, and the fifth lens element 50 has a fifth lens element thickness $T_5$. Therefore, the total thickness of all the lens elements in the optical imaging lens set 1 along the optical axis 4 is $T_{al}=T_1+T_2+T_3+T_4+T_5$.

In addition, between two adjacent lens elements in the optical imaging lens set 1 of the present invention there is an air gap G along the optical axis 4. For example, an air gap $G_{12}$ is disposed between the first lens element 10 and the second lens element 20, an air gap $G_{23}$ is disposed between the second lens element 20 and the third lens element 30, an air gap $G_{34}$ is disposed between the third lens element 30 and the fourth lens element 40, an air gap $G_{45}$ is disposed between the fourth lens element 40 and the fifth lens element 50. Therefore, the total four air gaps between adjacent lens elements from the first lens element 10 to the fifth lens element 50 along the optical axis 4 is $G_{aa}=G_{12}+G_{23}+G_{34}+G_{45}$.

First Example

Figure 2A:
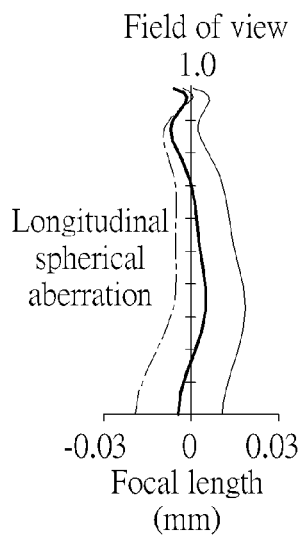
FIG. 2A illustrates the longitudinal spherical aberration on the image plane of the first example.
Figure 2B:
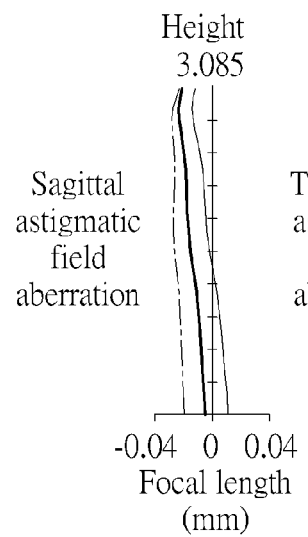
FIG. 2B illustrates the astigmatic aberration on the sagittal direction of the first example.
Figure 2C:
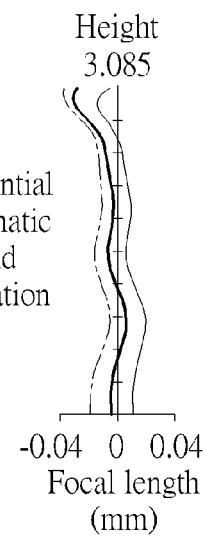
FIG. 2C illustrates the astigmatic aberration on the tangential direction of the first example.
Figure 2D:
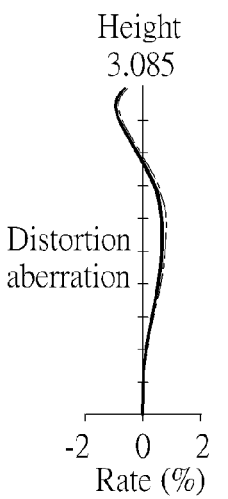
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "image height" and the image height is 3.085 mm in the disclosure.

The optical imaging lens set 1 of the first example has five lens elements 10 to 50, each is made of a plastic material and has refractive power. The optical imaging lens set 1 also has an aperture stop 80, a filter 60, and an image plane 71. The aperture stop 80 is provided in front of the first lens element 10, i.e. at the object side 2 of the first lens element 10. The filter 60 may be an infrared filter (IR cut filter) to prevent inevitable infrared in light reaching the image plane to adversely affect the imaging quality.

The first lens element 10 has positive refractive power. The first object-side surface 11 facing toward the object side 2 is a convex surface and the first image-side surface 12 facing toward the image side 3 has a concave part 13 in a vicinity of the optical axis and has a convex part 14 in a vicinity of the circular periphery of the first lens element. Both the first object-side surface 11 and the first image-side 12 of the first lens element 10 are aspherical surfaces.

The second lens element 20 has negative refractive power. The second object-side surface 21 facing toward the object side 2 has a convex part 23 in a vicinity of the optical axis and has a concave part 24 in a vicinity of the circular periphery of the second lens element. The second image-side surface 22 facing toward the image side 3 is concave. In addition, both the second object-side surface 21 and the second image-side surface 22 of the second lens element 20 are aspherical surfaces.

The third lens element 30 has negative refractive power, a third object-side surface 31 facing toward the object side 2 and a third image-side surface 32 facing toward the image side 3. The third object-side surface 31 is concave and has a concave part 33 (concave optical axis part) in a vicinity of an optical axis. The third image-side surface 32 is convex. In addition, both the third object-side surface 31 and the third image-side surface 32 of the third lens element 30 are aspherical surfaces.

The fourth lens element 40 has positive refractive power. The fourth object-side surface 41 facing toward the object side 2 is a concave surface and the fourth image-side surface 42 facing toward the image side 3 is a convex surface. Both the fourth object-side surface 41 and the fourth image-side 42 of the fourth lens element 40 are aspherical surfaces.

A fifth lens element 50 has negative refractive power, a fifth object-side surface 51 facing toward the object side 2 and a fifth image-side surface 52 facing toward the image side 3. The fifth object-side surface 51 is a concave surface. The fifth image-side surface 52 has a concave part 53 (concave optical axis part) in the vicinity of the optical axis and a convex part 54 (convex circular periphery part) in a vicinity of its circular periphery. Further, both the fifth object-side surface 51 and the fifth image-side 52 of the fifth lens element 50 are aspherical surfaces. The filter 60 may be an infrared filter, and is disposed between the fifth lens element 50 and the image plane 71.

By observing the longitudinal spherical aberration of the first example, it is suggested that all curves of every wavelength are close to one another, which reveals off-axis light of different heights of every wavelength all concentrates on the image plane, and deviations of every curve also reveal that off-axis light of different heights focuses on a spot within ±0.02 mm so the first example does improve the spherical aberration of different wavelengths. In addition, the distances amongst the three representing different wavelengths are pretty close to one another. It means light of the three representing different wavelengths goes to almost the same spot so the aberration is greatly improved.

In the two astigmatic field aberrations on the sagittal and tangential directions of the first example, light of the three representing different wavelengths in the entire field of view focuses on a spot within ±0.05 mm and the focal spot on the sagittal direction is within an even smaller range of ±0.03 mm, which suggests that the optical imaging lens set of the first example is able to effectively eliminate aberrations. In addition, the distances amongst the three representing different wavelengths are pretty close to one another. It means the aberration on the axis is greatly improved. The distortion aberration reveals that the distortion aberration of the first example is within a range of ±1%, which suggests the distortion aberration of the first example meets the demands of the imaging quality of an optical system. Compared with the current optical lens system, the first example shows less aberration/distortion and better imaging quality with a system length not greater than 5.2 mm. The demonstrated first example may maintain a good optical performance and reduced lens set length to realize a smaller product design.

In the optical imaging lens element 1 of the present invention, the object side 11/21/31/41/51 and image side 12/22/32/42/52 from the first lens element 10 to the fifth lens element 50, total of ten surfaces are all aspherical. These aspheric coefficients are defined according to the following formula:

$$Z(Y) = \frac{Y^2}{R} / \left(1 + \sqrt{1 - (1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant;

$a_{2i}$ is the aspheric coefficient of the 2i order.

The optical data of the first example of the optical imaging lens set 1 are shown in FIG. 20 while the aspheric surface data are shown in FIG. 21. In the following examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set is 5.145 mm. Some important ratios of the first example are as follows:

$T_{al}$=2.564

$G_{aa}$=1.169

$T_{al}/G_{12}$=44.685 (meet the requirement of less than 45.0)

$G_{34}/G_{45}$=1.340 (meet the requirement of less than 1.4)
$T_4/G_{34}$=1.786 (meet the requirement of less than 1.9)
$G_{aa}/G_{34}$=3.918 (meet the requirement of less than 5.3)
$T_1/T_2$=2.738 (meet the requirement of more than 2.35)
$G_{23}/G_{34}$=1.979 (meet the requirement between 1.0~2.0)
$T_4/T_5$=0.807 (meet the requirement of less than 1.8)

Second Example

Figure 3:
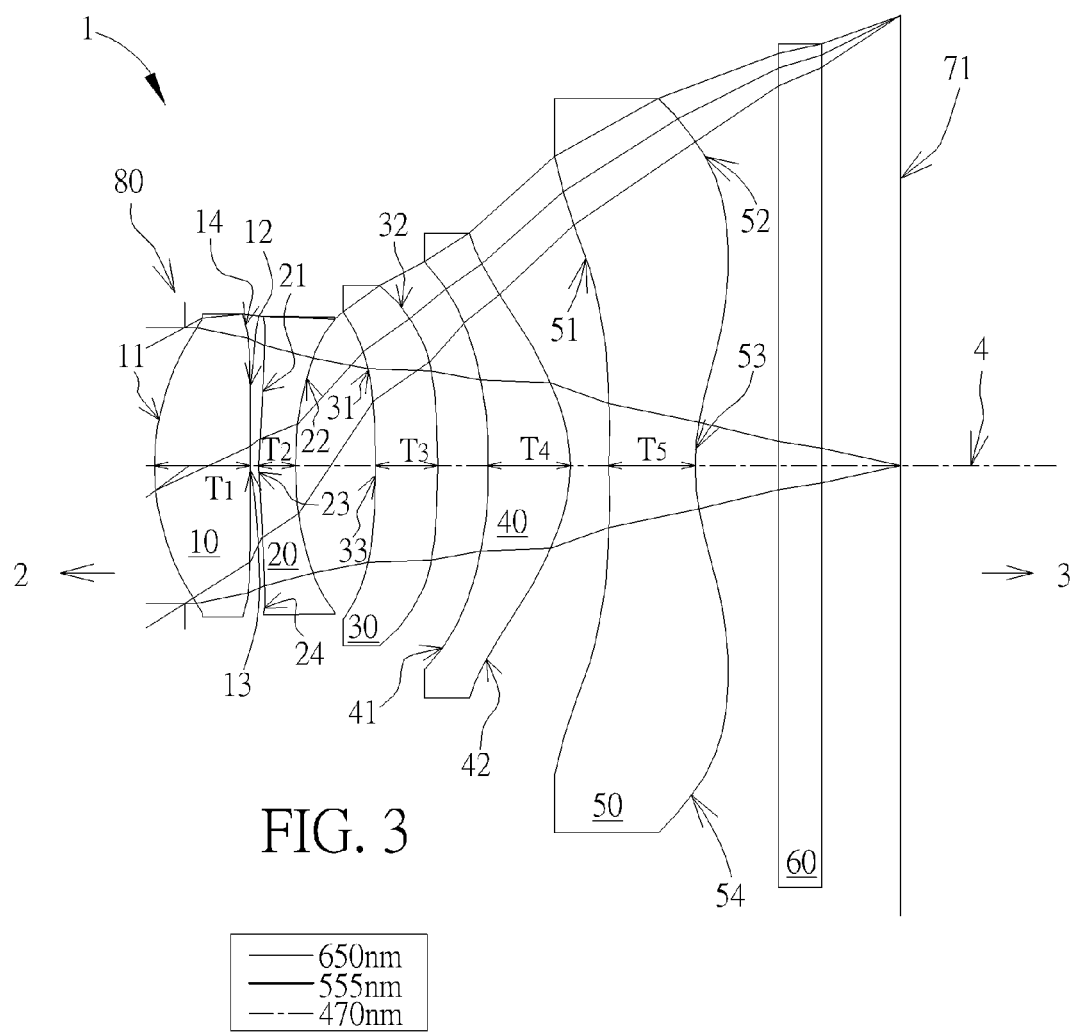
FIG. 3 illustrates a second example of the optical imaging lens set of five lens elements of the present invention.
Figure 4A:
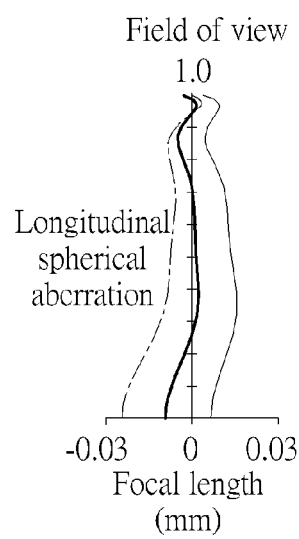
FIG. 4A illustrates the longitudinal spherical aberration on the image plane of the second example.
Figure 4B:
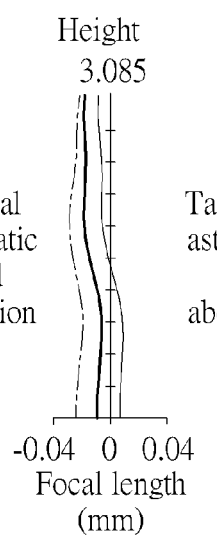
FIG. 4B illustrates the astigmatic aberration on the sagittal direction of the second example.
Figure 4C:
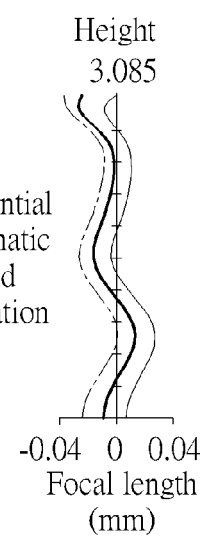
FIG. 4C illustrates the astigmatic aberration on the tangential direction of the second example.
Figure 4D:
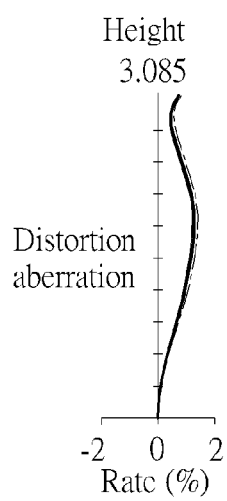
FIG. 4D illustrates the distortion aberration of the second example.

Please refer to FIG. 3 which illustrates the second example of the optical imaging lens set 1 of the present invention. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The second example is similar with the first example with different optical data. The optical data of the second example of the optical imaging lens set are shown in FIG. 22 while the aspheric surface data are shown in FIG. 23. The length of the optical imaging lens set is 5.101 mm. Some important ratios of the second example are as follows:
$T_{al}$=2.472
$G_{aa}$=1.225
$T_{al}/G_{12}$=43.074 (meet the requirement of less than 45.0)
$G_{34}/G_{45}$=1.292 (meet the requirement of less than 1.4)
$T_4/G_{34}$=1.600 (meet the requirement of less than 1.9)
$G_{aa}/G_{34}$=3.513 (meet the requirement of less than 5.3)
$T_1/T_2$=2.604 (meet the requirement of more than 2.35)
$G_{23}/G_{34}$=1.574 (meet the requirement between 1.0~2.0)
$T_4/T_5$=0.953 (meet the requirement of less than 1.8)

Third Example

Figure 5:
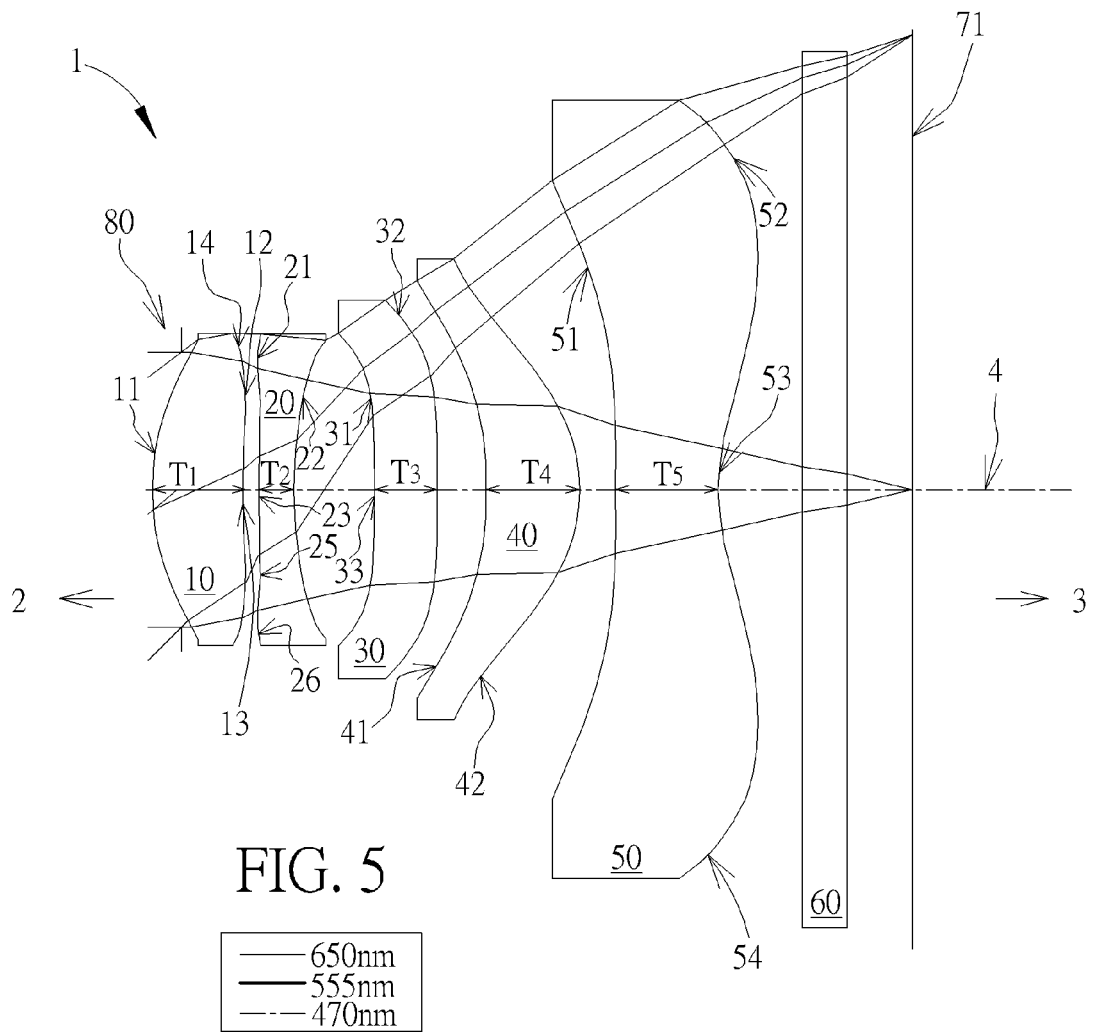
FIG. 5 illustrates a third example of the optical imaging lens set of five lens elements of the present invention.
Figures 6A, 6B, 6C, 6D:
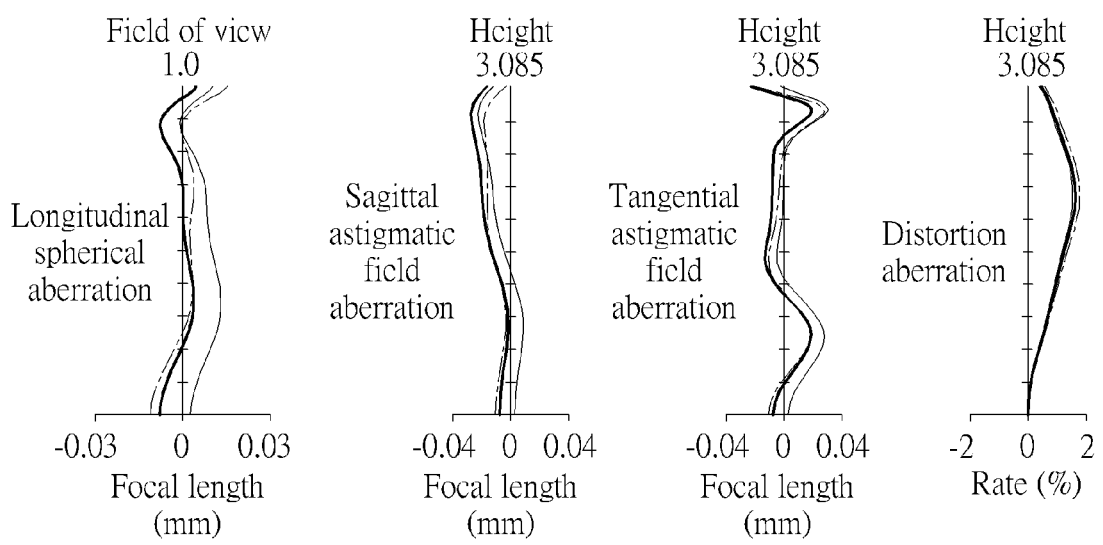
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.

Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The third example is similar with the first example. The differences are that the second object-side surface 21 of the second lens element 20 has a convex part 23 in a vicinity of the optical axis, a convex part 26 in a vicinity of the circular periphery and a concave part 25 between the optical axis and the circular periphery. The optical data of the third example of the optical imaging lens set are shown in FIG. 24 while the aspheric surface data are shown in FIG. 25. The length of the optical imaging lens set is 5.15 mm. Some important ratios of the first example are as follows:
$T_{al}$=2.631
$G_{aa}$=1.207
$T_{al}/G_{12}$=32.738 (meet the requirement of less than 45.0)
$G_{34}/G_{45}$=1.386 (meet the requirement of less than 1.4)
$T_4/G_{34}$=1.880 (meet the requirement of less than 1.9)
$G_{aa}/G_{34}$=3.596 (meet the requirement of less than 5.3)
$T_1/T_2$=2.619 (meet the requirement of more than 2.35)
$G_{23}/G_{34}$=1.635 (meet the requirement between 1.0~2.0)
$T_4/T_5$=0.906 (meet the requirement of less than 1.8)

Fourth Example

Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The fourth example is similar with the first example. The difference is that the third lens element 30 has positive refractive power. The optical data of the fourth example of the optical imaging lens set are shown in FIG. 26 while the aspheric surface data are shown in FIG. 27. The length of the optical imaging lens set is 5.122 mm. Some important ratios of the first example are as follows:
$T_{al}$=2.667
$G_{aa}$=1.140
$T_{al}/G_{12}$=33.185 (meet the requirement of less than 45.0)
$G_{34}/G_{45}$=1.385 (meet the requirement of less than 1.4)
$T_4/G_{34}$=1.883 (meet the requirement of less than 1.9)
$G_{aa}/G_{34}$=3.519 (meet the requirement of less than 5.3)
$T_1/T_2$=2.641 (meet the requirement of more than 2.35)
$G_{23}/G_{34}$=1.549 (meet the requirement between 1.0~2.0)
$T_4/T_5$=0.879 (meet the requirement of less than 1.8)

Fifth Example

Figure 9:
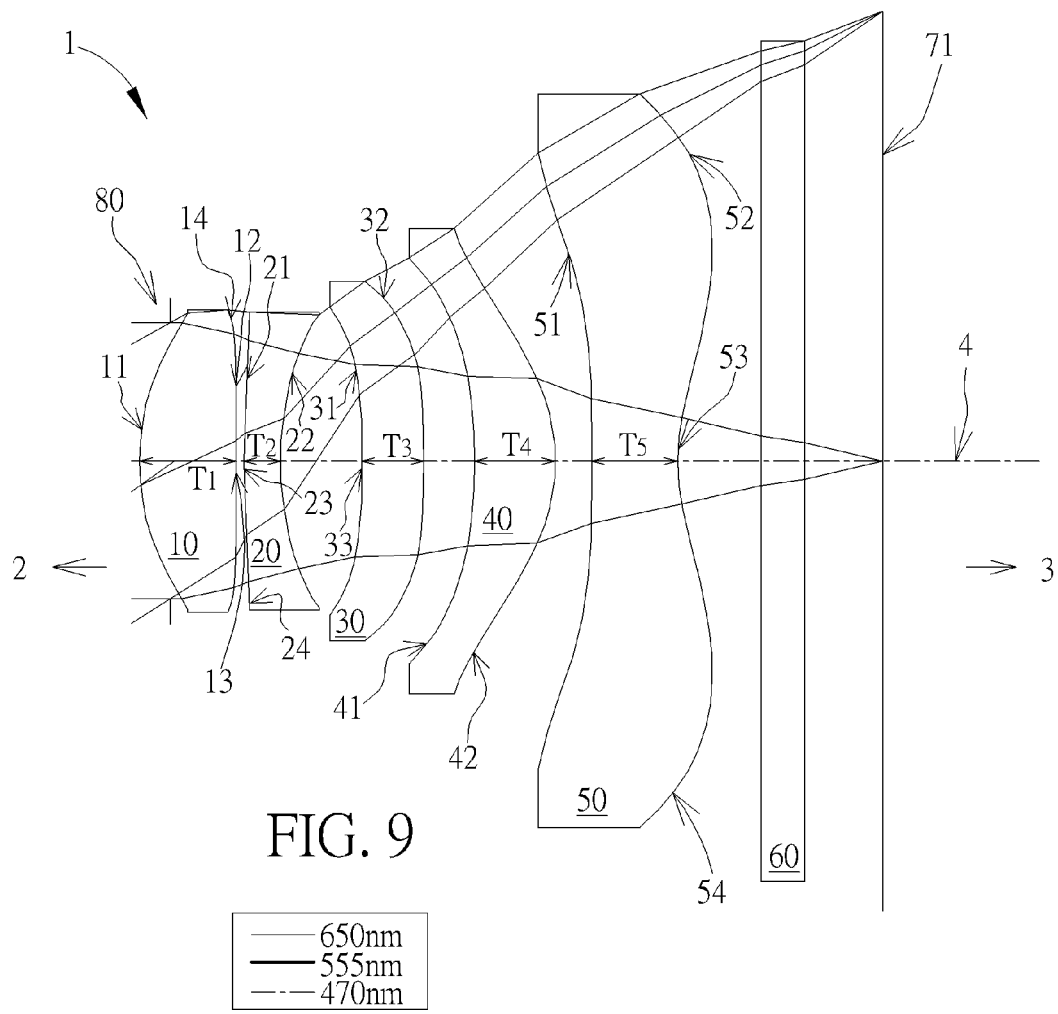
FIG. 9 illustrates a fifth example of the optical imaging lens set of five lens elements of the present invention.
Figure 10A:
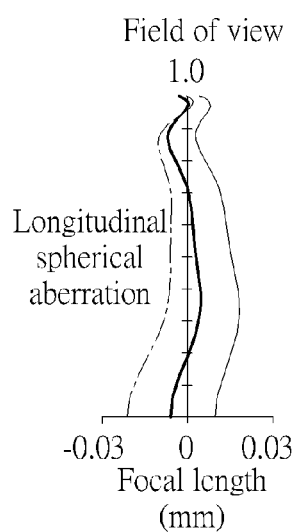
FIG. 10A illustrates the longitudinal spherical aberration on the image plane of the fifth example.
Figure 10B:
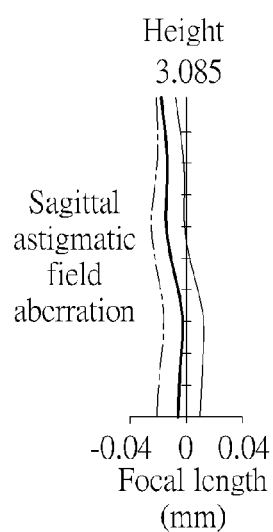
FIG. 10B illustrates the astigmatic aberration on the sagittal direction of the fifth example.
Figure 10C:
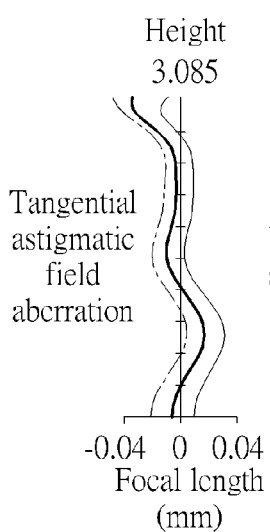
FIG. 10C illustrates the astigmatic aberration on the tangential direction of the fifth example.
Figure 10D:
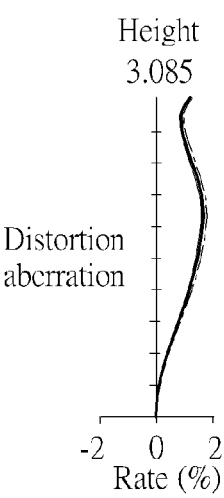
FIG. 10D illustrates the distortion aberration of the fifth example.

Please refer to FIG. 9 which illustrates the fifth example of the optical imaging lens set 1 of the present invention. Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The fifth example is similar with the first example with different optical data. The optical data of the fifth example of the optical imaging lens set 1 are shown in FIG. 28 while the aspheric surface data are shown in FIG. 29. The length of the optical imaging lens set is 5.101 mm. Some important ratios of the first example are as follows:
$T_{al}$=2.476
$G_{aa}$=1.218
$T_{al}/G_{12}$=43.145 (meet the requirement of less than 45.0)
$G_{34}/G_{45}$=1.395 (meet the requirement of less than 1.4)
$T_4/G_{34}$=1.600 (meet the requirement of less than 1.9)
$G_{aa}/G_{34}$=3.490 (meet the requirement of less than 5.3)
$T_1/T_2$=2.650 (meet the requirement of more than 2.35)
$G_{23}/G_{34}$=1.609 (meet the requirement between 1.0~2.0)
$T_4/T_5$=0.947 (meet the requirement of less than 1.8)

Sixth Example

Figure 11:
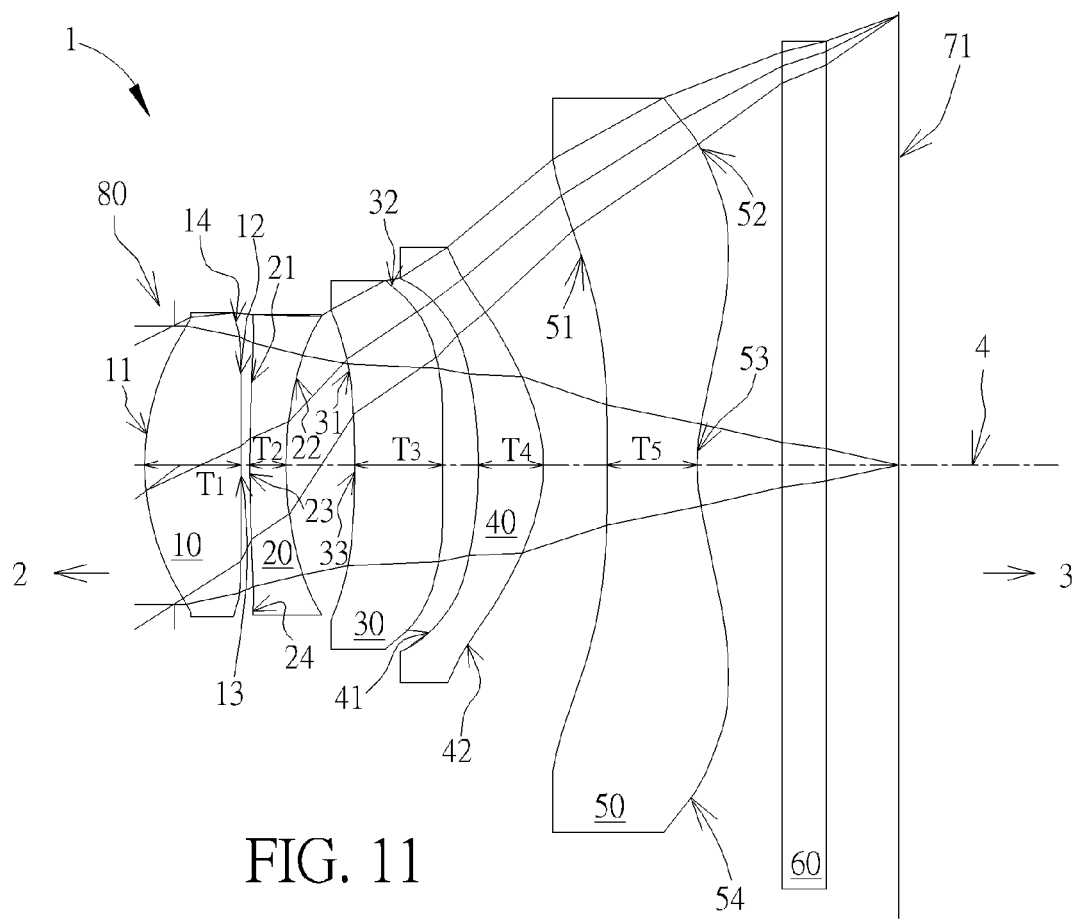
FIG. 11 illustrates a sixth example of the optical imaging lens set of five lens elements of the present invention.
Figure 12A:
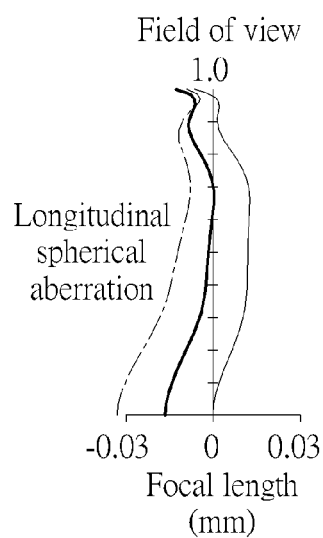
FIG. 12A illustrates the longitudinal spherical aberration on the image plane of the sixth example.
Figure 12B:
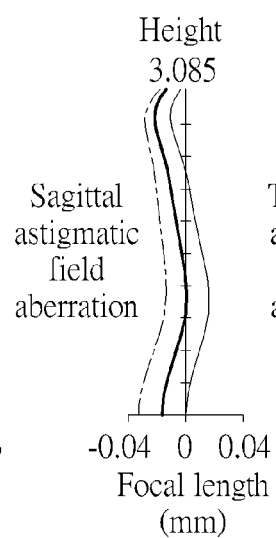
FIG. 12B illustrates the astigmatic aberration on the sagittal direction of the sixth example.
Figure 12C:
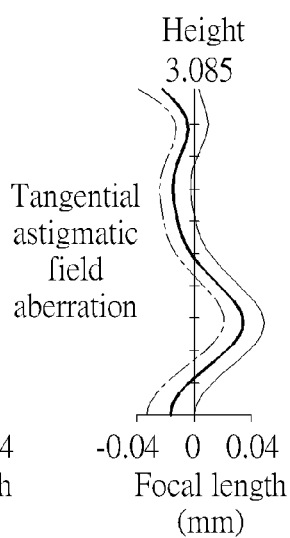
FIG. 12C illustrates the astigmatic aberration on the tangential direction of the sixth example.
Figure 12D:
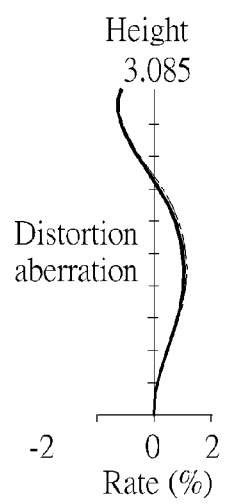
FIG. 12D illustrates the distortion aberration of the sixth example.

Please refer to FIG. 11 which illustrates the sixth example of optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The sixth example is similar with the first example with different optical data. The optical data of the sixth example of the optical imaging lens set 1 are shown in FIG. 30 while the aspheric surface data are shown in FIG. 31. The length of the optical imaging lens set is 5.127 mm. Some important ratios of the first example are as follows:
$T_{al}$=2.565
$G_{aa}$=1.197
$T_{al}/G_{12}$=44.705 (meet the requirement of less than 45.0)
$G_{34}/G_{45}$=0.552 (meet the requirement of less than 1.4)
$T_4/G_{34}$=1.850 (meet the requirement of less than 1.9)
$G_{aa}/G_{34}$=5.000 (meet the requirement of less than 5.3)
$T_1/T_2$=2.623 (meet the requirement of more than 2.35)

$G_{23}/G_{34}$=1.948 (meet the requirement between 1.0~2.0)
$T_4/T_5$=0.718 (meet the requirement of less than 1.8)

Seventh Example

Figure 13:
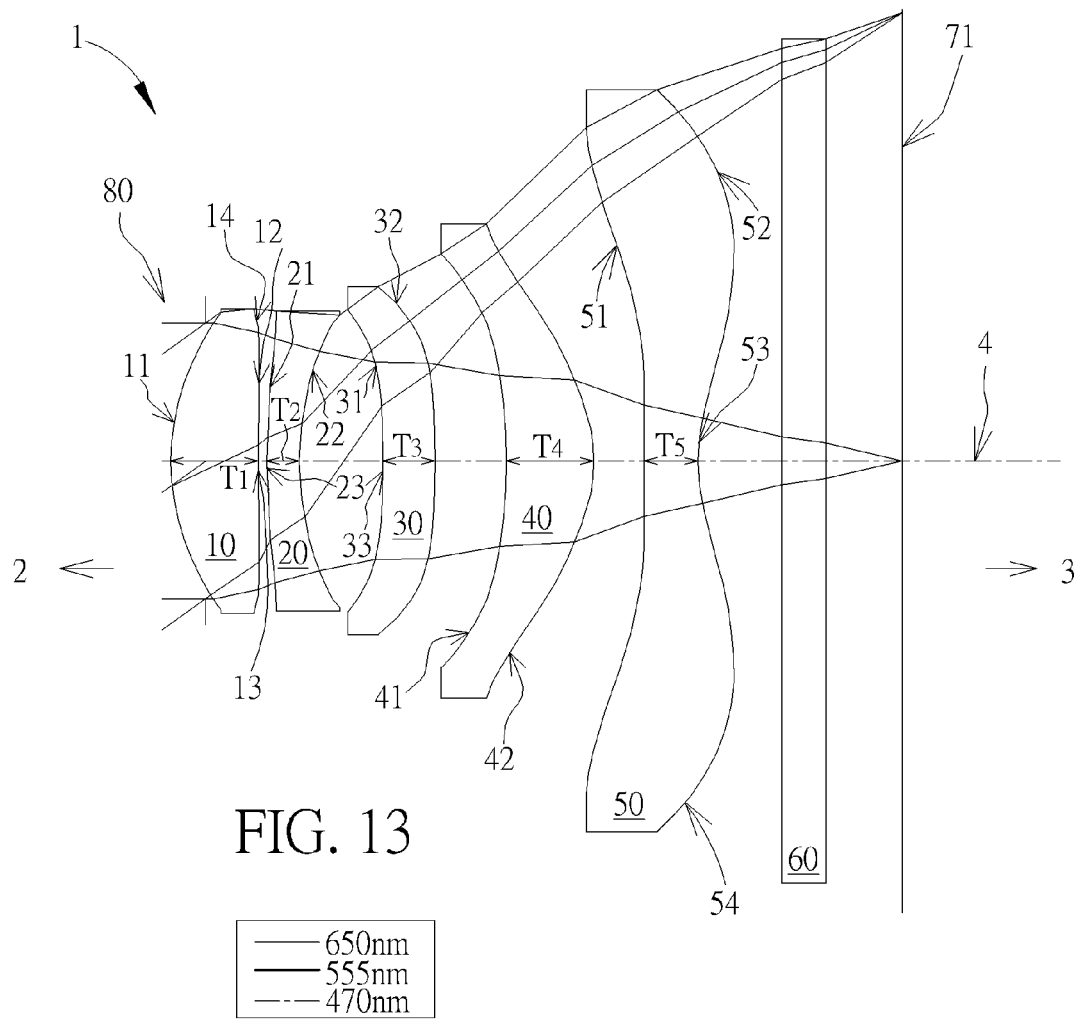
FIG. 13 illustrates a seventh example of the optical imaging lens set of five lens elements of the present invention.
Figures 14A, 14B, 14C, 14D:
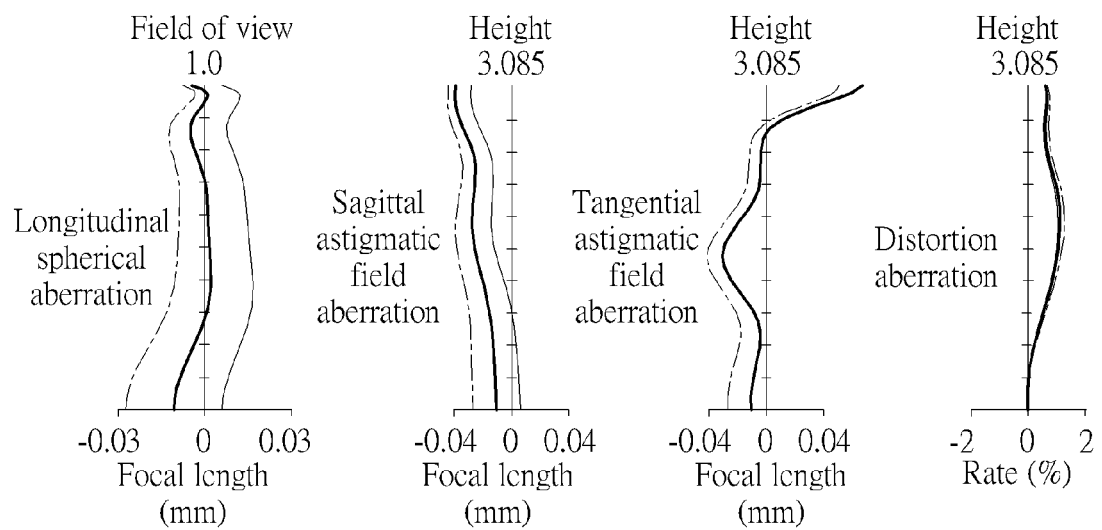
FIG. 14A illustrates the longitudinal spherical aberration on the image plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.

Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The seventh example is similar with the first example with the exception that the second object-side surface 21 of the second lens element 20 is a convex surface as a whole. The optical data of the seventh example of the optical imaging lens set 1 are shown in FIG. 32 while the aspheric surface data are shown in FIG. 33. The length of the optical imaging lens set is 5.017 mm. Some important ratios of the first example are as follows:
$T_{al}$=2.147
$G_{aa}$=1.467
$T_{al}/G_{12}$=37.420 (meet the requirement of less than 45.0)
$G_{34}/G_{45}$=1.392 (meet the requirement of less than 1.4)
$T_4/G_{34}$=1.237 (meet the requirement of less than 1.9)
$G_{aa}/G_{34}$=3.019 (meet the requirement of less than 5.3)
$T_1/T_2$=2.700 (meet the requirement of more than 2.35)
$G_{23}/G_{34}$=1.183 (meet the requirement between 1.0~2.0)
$T_4/T_5$=1.628 (meet the requirement of less than 1.8)

Eighth Example

Please refer to FIG. 15 which illustrates the eighth example of the optical imaging lens set 1 of the present invention. Please refer to FIG. 16A for the longitudinal spherical aberration on the image plane 71 of the first example; please refer to FIG. 16B for the astigmatic aberration on the sagittal direction; please refer to FIG. 16C for the astigmatic aberration on the tangential direction, and please refer to FIG. 16D for the distortion aberration. The eighth example is similar with the first example with the exception that the second object-side surface 21 of the second lens element 20 is a convex surface as a whole. The optical data of the eighth example of the optical imaging lens set 1 are shown in FIG. 34 while the aspheric surface data are shown in FIG. 35. The length of the optical imaging lens set is 5.038 mm. Some important ratios of the first example are as follows:
$T_{al}$=2.239
$G_{aa}$=1.383
$T_{al}/G_{12}$=39.018 (meet the requirement of less than 45.0)
$G_{34}/G_{45}$=1.200 (meet the requirement of less than 1.4)
$T_4/G_{34}$=1.600 (meet the requirement of less than 1.9)
$G_{aa}/G_{34}$=3.500 (meet the requirement of less than 5.3)
$T_1/T_2$=2.720 (meet the requirement of more than 2.35)
$G_{23}/G_{34}$=1.521 (meet the requirement between 1.0~2.0)
$T_4/T_5$=1.650 (meet the requirement of less than 1.8)

Some important ratios in each example are shown in FIG. 36.

In the light of the above examples, the inventors observe the following features:
1) the fourth lens element of the optical imaging lens set of five lens elements of the present invention has positive refractive power to yield the positive refractive power of the entire optical imaging lens set of five lens elements of the present invention,
2) the convex part in a vicinity of a circular periphery of the first image-side surface of the first lens element, the convex part in a vicinity of the optical axis of the second object-side surface of the second lens element, the concave part in a vicinity of the optical axis of the third object-side surface of the third lens element and the concave part in a vicinity of the optical axis of the fifth lens element may together enhance the better imaging results.

In addition, the inventors discover that there are some better ratio ranges for different data according to the above various important ratios. Better ratio ranges help the designers to design the better optical performance and an effectively reduced length of a practically possible optical imaging lens set. For example: 1. ($T_{al}/G_{12}$) should be not greater than 45.0. $T_{al}$ is the total thickness of all the lens elements in the optical imaging lens set 1 along the optical axis 4 and a smaller one helps to reduce the size of the optical imaging lens set. It is suggested that the ratio of ($T_{al}/G_{12}$) tends to be smaller, preferably not greater than 45.0 and more preferably 15.0~45.0.

2. ($G_{34}/G_{45}$) should be not greater than 1.4. With a trend of a smaller optical imaging lens set, the air gap between each lens element should be as small as possible but some air gaps are naturally fairly restricted. The air gap between the fourth lens element and the fifth lens element should be kept at a sufficient level, namely $G_{45}$ is large enough, to allow the imaging light suitably expanding before entering the fifth lens element. This helps to lower the chief ray angle to enhance the sensitivity of imaging elements. The $G_{34}$ is fairly unrestricted so it may reduce more than $G_{45}$ does. ($G_{34}/G_{45}$) should not be too large, preferably not greater than 1.4 and more preferably 0.5~1.4.

3. ($T_4/G_{34}$) should be not greater than 1.9. The fourth lens element 40 is usually thicker for providing positive refractive power of the optical imaging lens set. A smaller $T_4$ should make the total system length shorter. It is suggested that ($T_4/G_{34}$) should be not too large, preferably not greater than 1.9 and more preferably between 0.8~1.9.

4. ($G_{aa}/G_{34}$) should be not greater than 5.3. Smaller $G_{aa}$ and $G_{34}$ both help the optical imaging lens set to be thinner, but ($G_{aa}/G_{34}$) should not be too large to assemble the optical imaging lens set. It is suggested that ($G_{aa}/G_{34}$) should be not greater than 5.3, preferably between 2.0~5.3.

5. ($T_1/T_2$) should be not less than 2.35 so that the first lens element and the second lens element may have optimal thickness. It is suggested between 2.35~3.5.

6. ($G_{23}/G_{34}$) should be between 1~2. The air gap between the second lens element and the third lens element may be larger because the center part of the third lens element is concave so ($G_{23}/G_{34}$) should be not less than 1. Besides, ($G_{23}/G_{34}$) should be between 1~2 to avoid a too large $G_{23}$ to have a thinner optical imaging lens set or too small $G_{23}$ to assemble the optical imaging lens set.

7. ($T_4/T_5$) should be not greater than 1.9. The fourth lens element 40 is thicker due to the positive refractive power. ($T_4/T_5$) is suggested to be not greater than 1.9 to avoid the thickness of the fourth lens element and the fifth lens element not compatible with each other or to make it harder to assembly due to a smaller $T_5$. It is preferably between 0.7~1.9.

Figure 18:
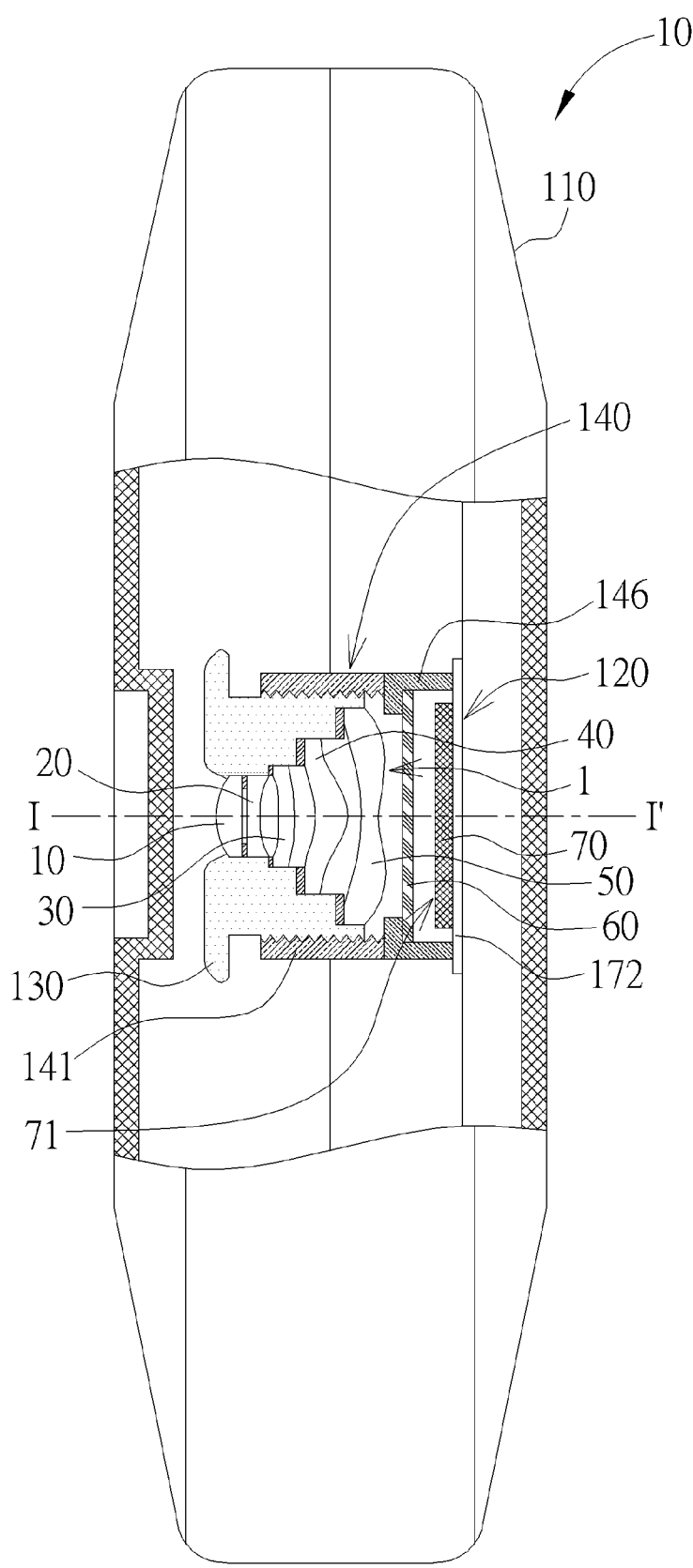
FIG. 18 illustrates a first preferred example of the portable electronic device with an optical imaging lens set of the present invention.

The optical imaging lens set 1 of the present invention may be applied to a portable electronic device. Please refer to FIG. 18. FIG. 18 illustrates a first preferred example of the optical imaging lens set 1 of the present invention for use in a portable electronic device 100. The portable electronic device 100 includes a case 110, and an image module 120 mounted in the case 110. A mobile phone is illustrated in FIG. 18 as an example, but the portable electronic device 100 is not limited to a mobile phone.

As shown in FIG. 18, the image module 120 includes the optical imaging lens set 1 as described above. FIG. 18 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

To be noticed in particular, the optional filter 60 may be omitted in other examples although the optional filter 60 is present in this example. The case 110, the barrel 130, and/or the module housing unit 140 may be a single element or consist of a plurality of elements, but the present invention is not limited to this. The image sensor 70 used here is a product of chip on board (COB) package rather than a product of the conventional chip scale package (CSP) so it is directly attached to the substrate 172, but the present invention is not limited to this.

Each one of the five lens elements 10, 20, 30, 40 and 50 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Because the optical imaging lens set 1 of the present invention may be as short as 5 mm, this ideal length allows the dimensions and the size of the portable electronic device 100 to be smaller and lighter, but excellent optical performance and image quality are still possible. In such a way, the various examples of the present invention satisfy the need for economic benefits of using less raw materials in addition to satisfy the trend for a smaller and lighter product design and consumers' demands.

Figure 19:
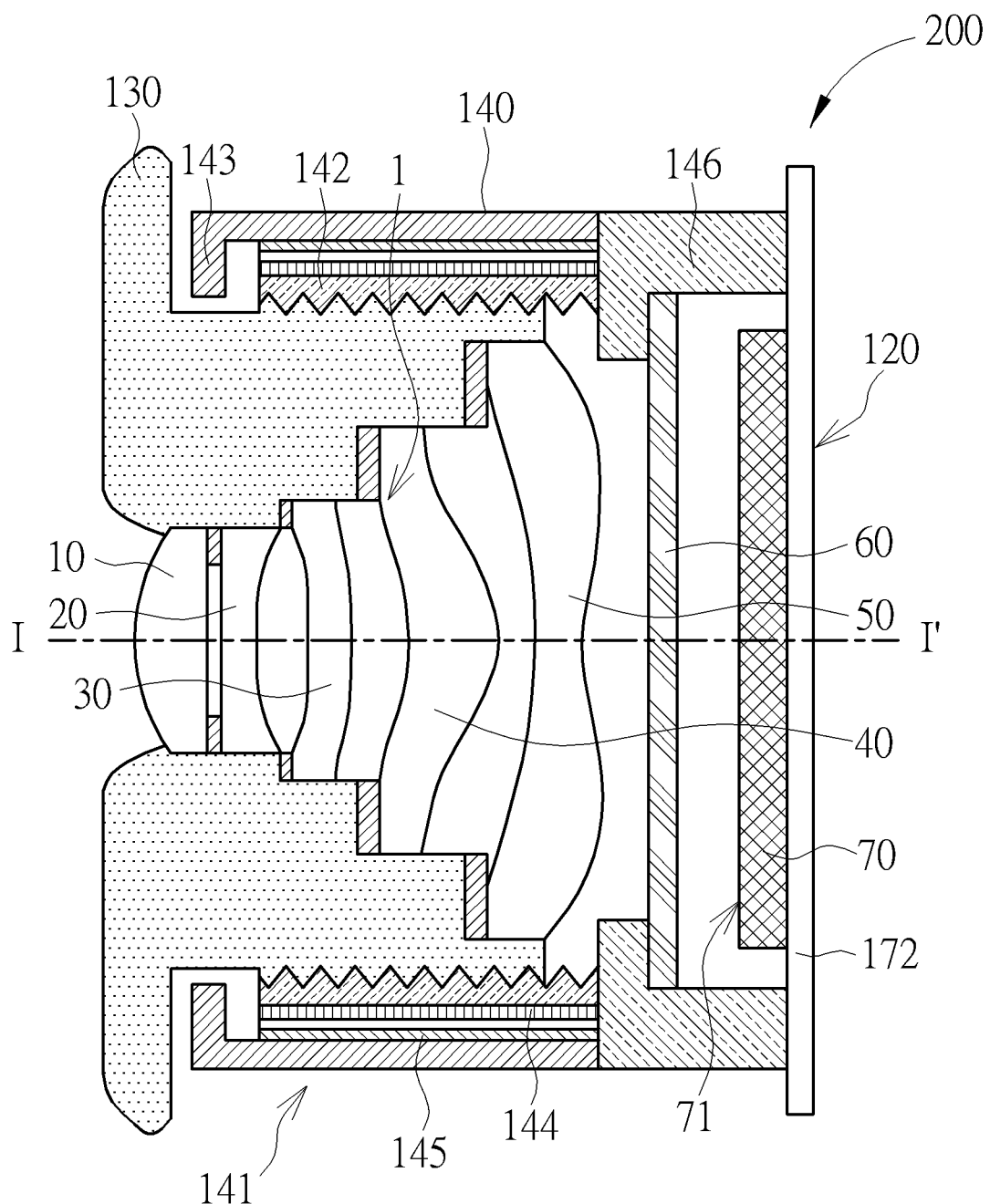
FIG. 19 illustrates a second preferred example of the portable electronic device with an optical imaging lens set of the present invention.

Please also refer to FIG. 19 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 60, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising:
    an aperture stop;
    a first lens element having a first image-side surface facing toward said image side and said first image-side surface having a convex part in a vicinity of a circular periphery of said first lens element;
    a second lens element having a second object-side surface facing toward said object side and said second object-side surface having a convex part in a vicinity of said optical axis;
    a third lens element having a third object-side surface facing toward said object side and said third object-side surface having a concave part in a vicinity of said optical axis;
    a fourth lens element with positive refractive power; and
    a fifth lens element made of plastic, having a fifth image-side surface facing toward said image side and said fifth image-side surface having a concave part in a vicinity of said optical axis and having a fifth object-side surface facing toward said object side and said fifth object-side surface having a concave part in a vicinity of said optical axis, and the optical imaging lens set as a whole having only the first, the second, the third, the fourth and the fifth lens element having refracting power, wherein an air gap has a thickness $G_{12}$ between said first lens element and said second lens element along said optical axis, an air gap has a thickness $G_{23}$ between said second lens element and said third lens element along said optical axis, an air gap has a thickness $G_{34}$ between said third lens element and said fourth lens element along said optical axis, and an air gap has a thickness $G_{45}$ between said fourth lens element and said fifth lens element along said optical axis, total four air gaps have a total thickness $G_{aa}$ between said first lens element and said fifth lens element along said optical axis, said first lens element has a thickness $T_1$ along said optical axis, said second lens element has a thickness $T_2$ along said optical axis, said third lens element has a thickness $T_3$ along said optical axis, said fourth lens element has a thickness $T_4$ along said optical axis, said fifth lens element has a thickness $T_5$ along said optical axis, and said first lens element, said second lens element, said third lens element, said fourth lens element and said fifth lens element together have a total thickness $T_{al}$ along said optical axis.

2. The optical imaging lens set of claim 1, wherein $(T_{al}/G_{12}) \leq 45$.

3. The optical imaging lens set of claim 1, wherein $(T4/G_{34}) \leq 1.9$.

4. The optical imaging lens set of claim 3, wherein said fifth object-side surface of said fifth lens element further has a concave part in a vicinity of a circular periphery of said fifth lens element.

5. The optical imaging lens set of claim 4, wherein $(T_1/T_2) \geq 2.35$.

6. The optical imaging lens set of claim 2, wherein $(G_{34}/G_{45}) \leq 1.4$.

7. The optical imaging lens set of claim 6, wherein $(T_4/T_5) \leq 1.9$.

8. The optical imaging lens set of claim 7, wherein said third lens element has negative refractive power.

9. The optical imaging lens set of claim 1, wherein $(G_{34}/G_{45}) \leq 1.4$.

10. The optical imaging lens set of claim 9, wherein $(G_{aa}/G_{34}) \leq 5.3$.

11. The optical imaging lens set of claim 10, wherein $(T_4/G_{34}) \leq 1.9$.

12. The optical imaging lens set of claim 11, wherein said third lens element has negative refractive power.

13. The optical imaging lens set of claim 1, wherein $1.0 \leq (G_{23}/G_{34}) \leq 2.0$.

14. The optical imaging lens set of claim 13, wherein $(T_4/T_5) \leq 1.8$.

15. The optical imaging lens set of claim 14, wherein $(G_{aa}/G_{34}) \leq 5.3$.

16. The optical imaging lens set of claim 14, wherein $(T_1/T_2) \geq 2.35$.

17. An electronic device, comprising:
   a case; and
   an image module disposed in said case and comprising:
      an optical imaging lens set of claim 1;
      a barrel for the installation of said optical imaging lens set;
      a module housing unit for the installation of said barrel;
      a substrate for the installation of said module housing unit; and
      an image sensor disposed at said substrate and at an image side of said optical imaging lens set.

18. The electronic device of claim 17, wherein said module housing unit comprises a seat element for the installation of said barrel to move along said optical axis.

* * * * *